(12) United States Patent
Danziger et al.

(10) Patent No.: US 12,025,806 B1
(45) Date of Patent: Jul. 2, 2024

(54) METHODS OF FABRICATION OF OPTICAL APERTURE MULTIPLIERS HAVING RECTANGULAR WAVEGUIDE

(71) Applicant: Lumus Ltd., Ness Ziona (IL)

(72) Inventors: Yochay Danziger, Kfar Vradim (IL); Edgar Friedmann, Sdey-Avraham (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/231,282

(22) Filed: Aug. 8, 2023

Related U.S. Application Data

(63) Continuation of application No. 18/011,212, filed as application No. PCT/IL2022/050500 on May 12, 2022, now Pat. No. 11,822,053.

(60) Provisional application No. 63/197,542, filed on Jun. 7, 2021.

(51) Int. Cl.
| | |
|---|---|
| G02B 27/01 | (2006.01) |
| F21V 8/00 | (2006.01) |
| G02B 5/30 | (2006.01) |
| G02B 6/10 | (2006.01) |
| G02B 6/26 | (2006.01) |
| G02F 1/295 | (2006.01) |
| H04N 5/74 | (2006.01) |

(52) U.S. Cl.
CPC ................. *G02B 27/0172* (2013.01)

(58) Field of Classification Search
USPC ........................................... 359/619
See application file for complete search history.

(56) References Cited

U.S. PATENT DOCUMENTS

| | | | |
|---|---|---|---|
| 6,222,971 B1 * | 4/2001 | Veligdan | G02B 6/08 385/901 |
| 2019/0064518 A1 * | 2/2019 | Danziger | G02B 27/286 |
| 2020/0150332 A1 * | 5/2020 | Nakamura | G02B 27/145 |

* cited by examiner

*Primary Examiner* — Joseph P Martinez
*Assistant Examiner* — Grant A Gagnon
(74) *Attorney, Agent, or Firm* — Rivka Friedman

(57) ABSTRACT

A method of fabricating an optical aperture multiplier is provided. A slice and a first optical structure are obtained. The slice has external faces including a pair of parallel faces, and a first plurality of partially reflective internal surfaces oblique to the pair of parallel faces. The first optical structure has external surfaces including a planar coupling surface, and a second plurality of partially reflective internal surfaces oblique to the coupling surface. The slice is optically coupled with the first optical structure such that one of the faces of the pair of parallel faces is in facing relation with the coupling surface to form a second optical structure. At least one optical aperture multiplier is sliced from the second optical structure by cutting the second optical structure through at least two cutting planes perpendicular to the coupling surface. The optical aperture multiplier is preferably part of a near eye display augmented reality system.

13 Claims, 9 Drawing Sheets

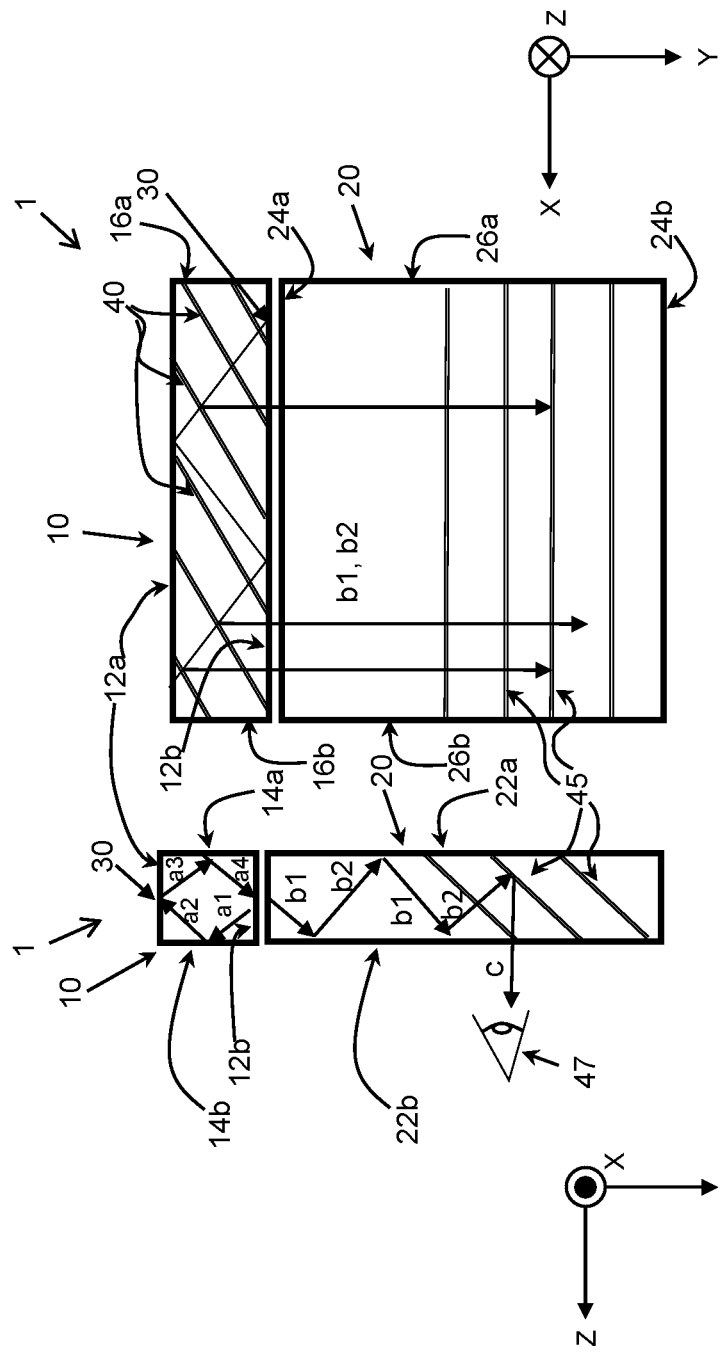

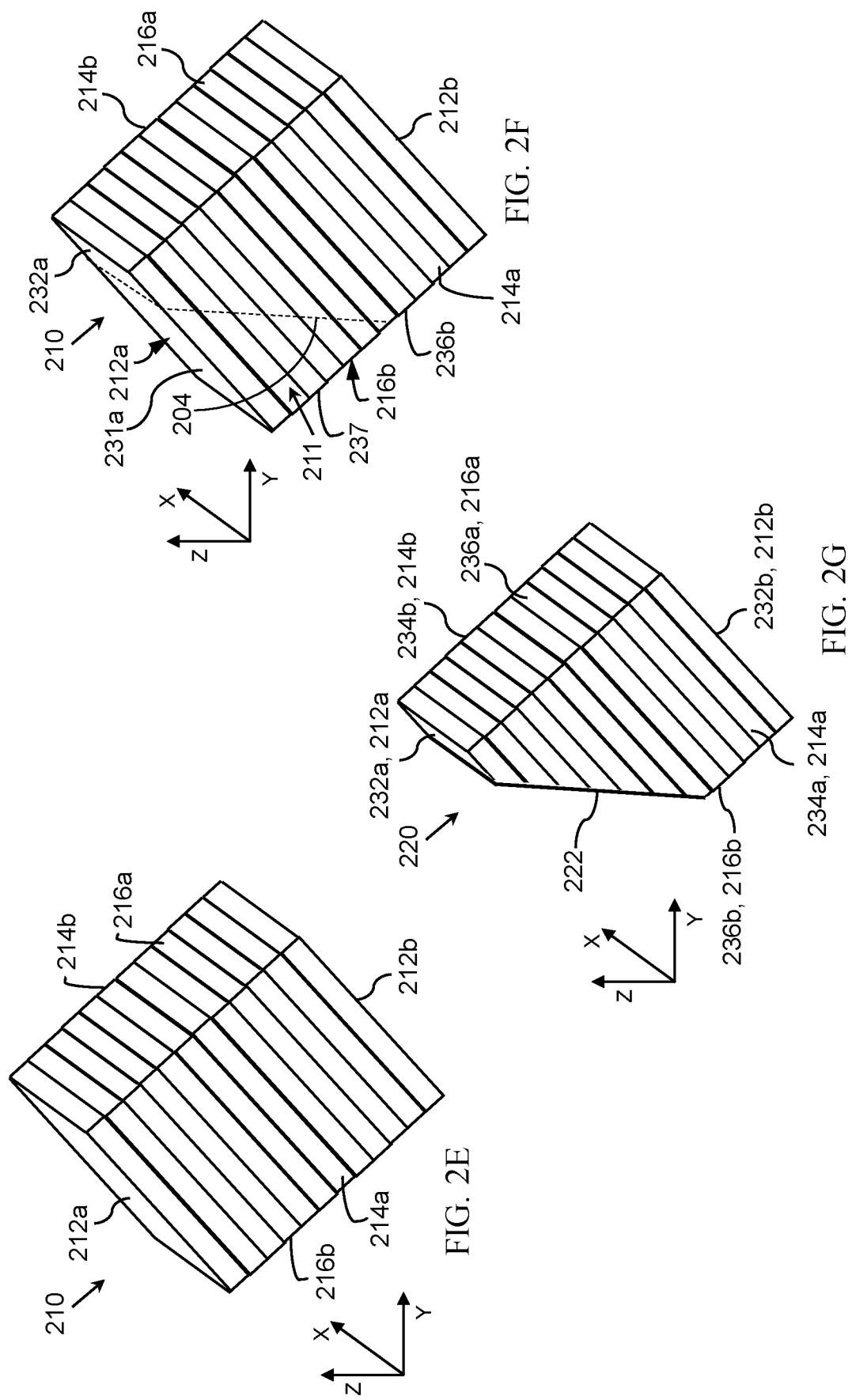

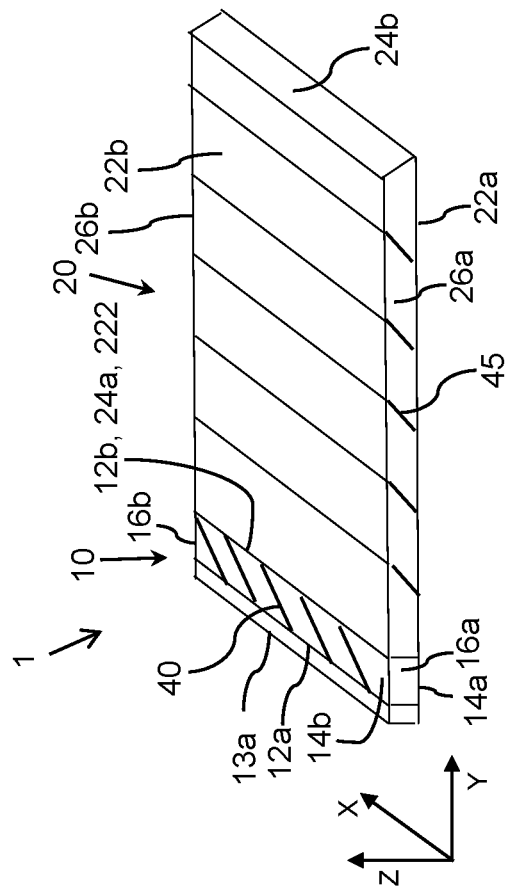
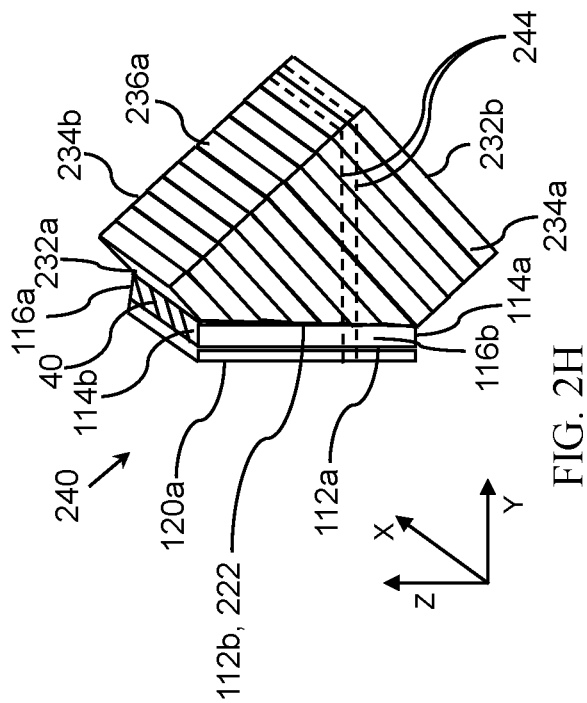
FIG. 2I
FIG. 2H

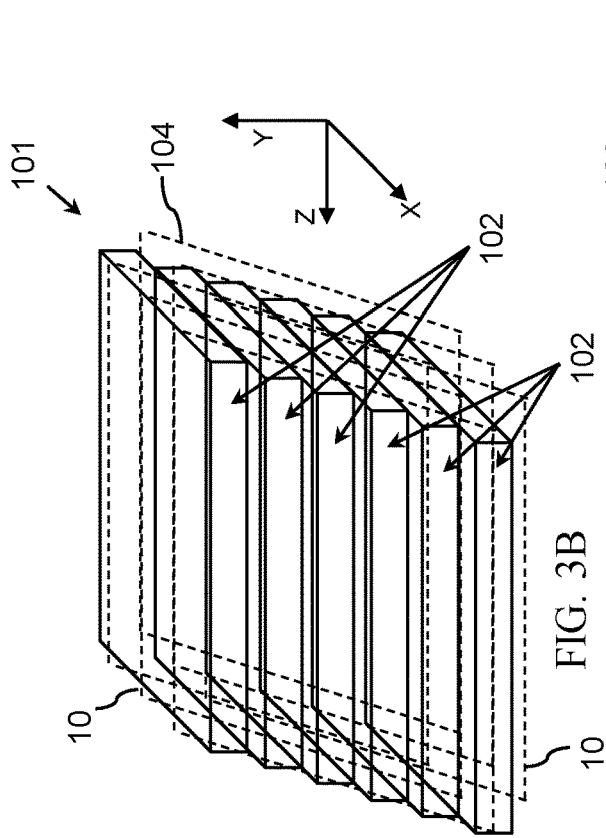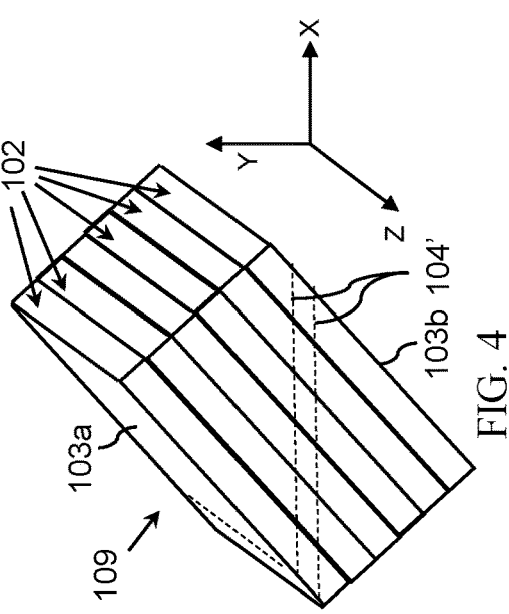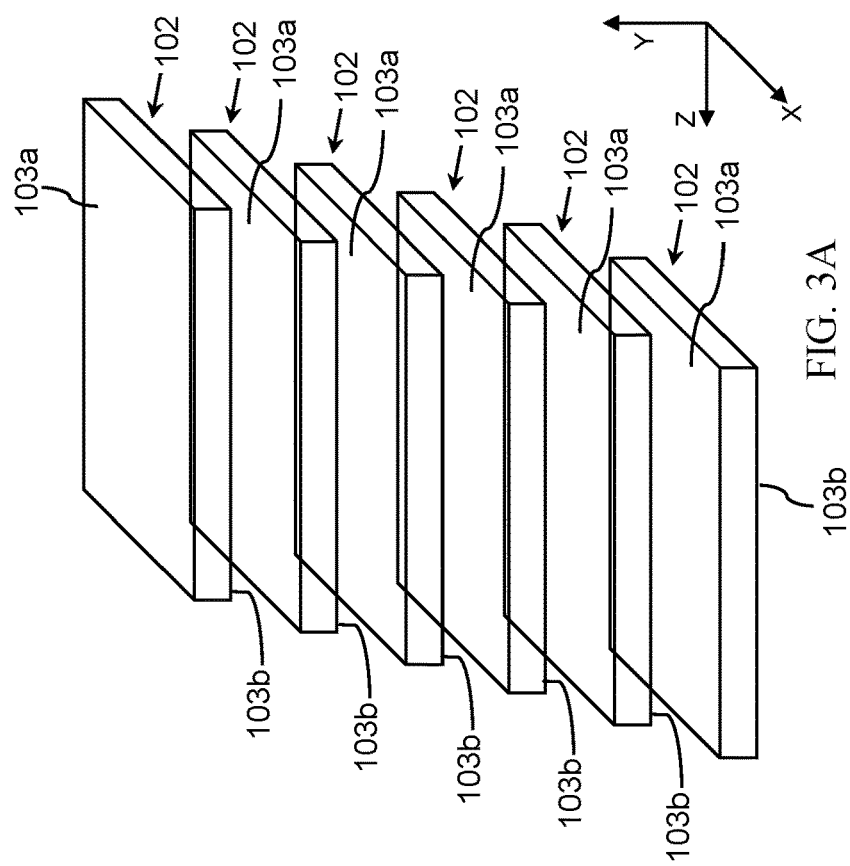

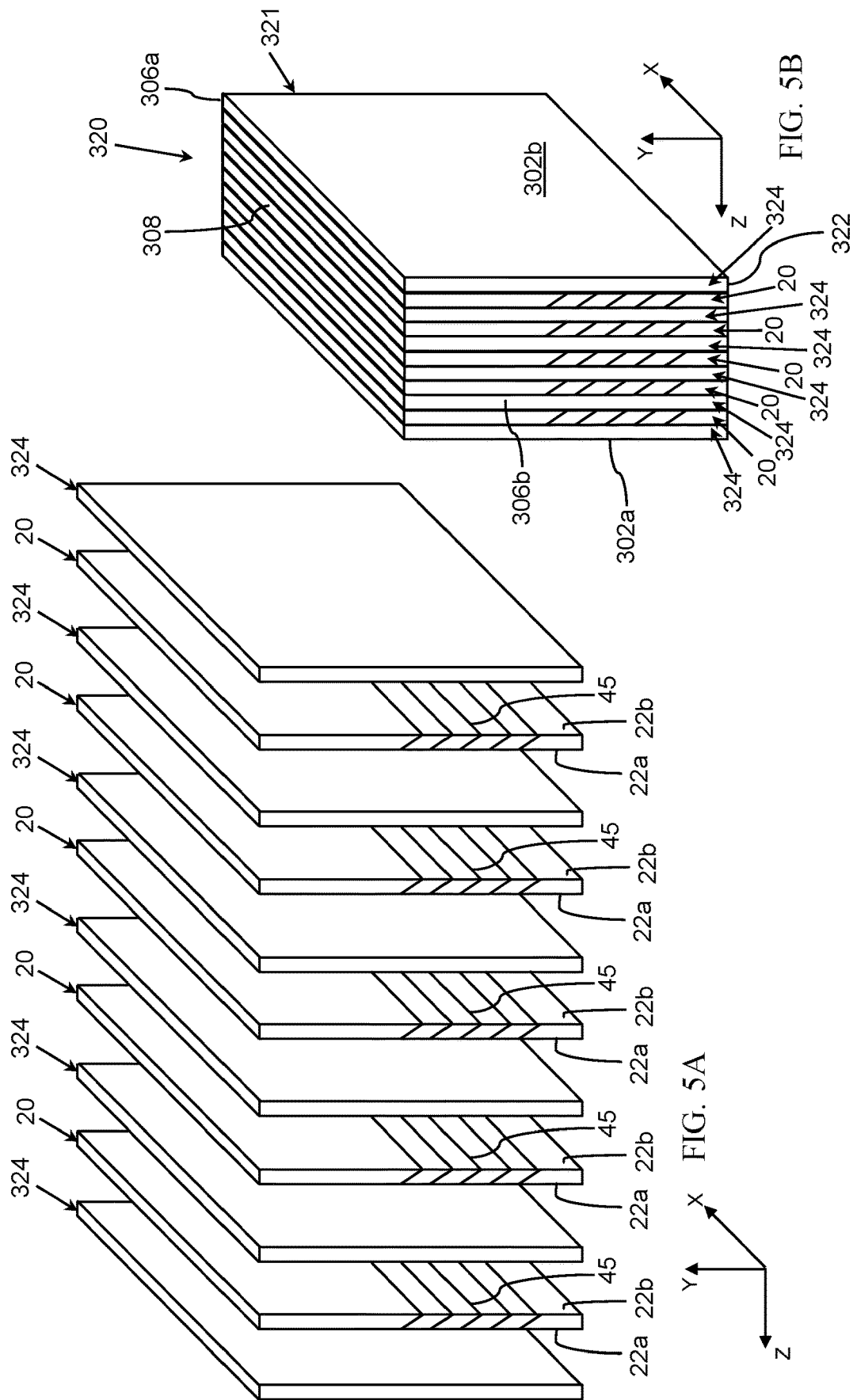

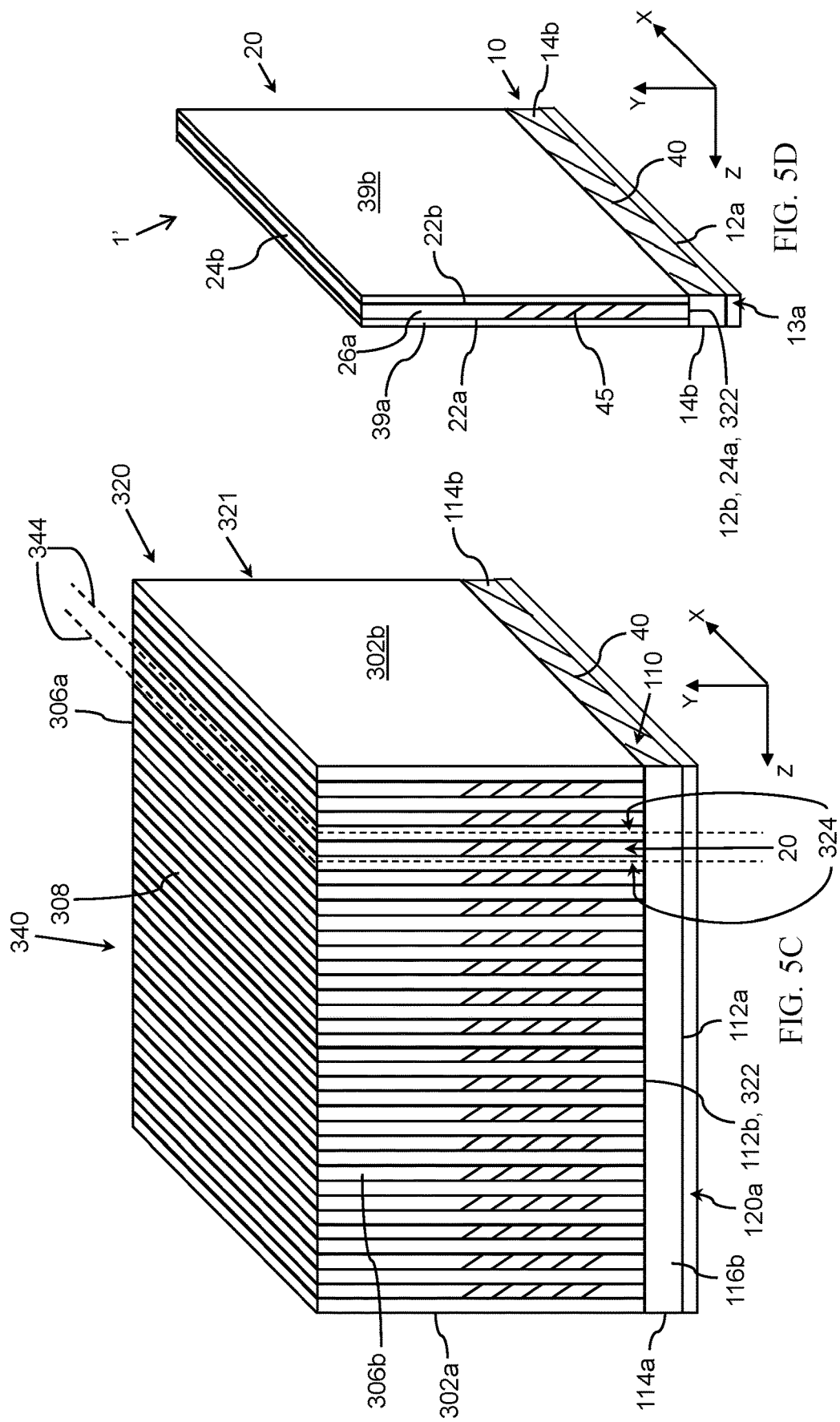

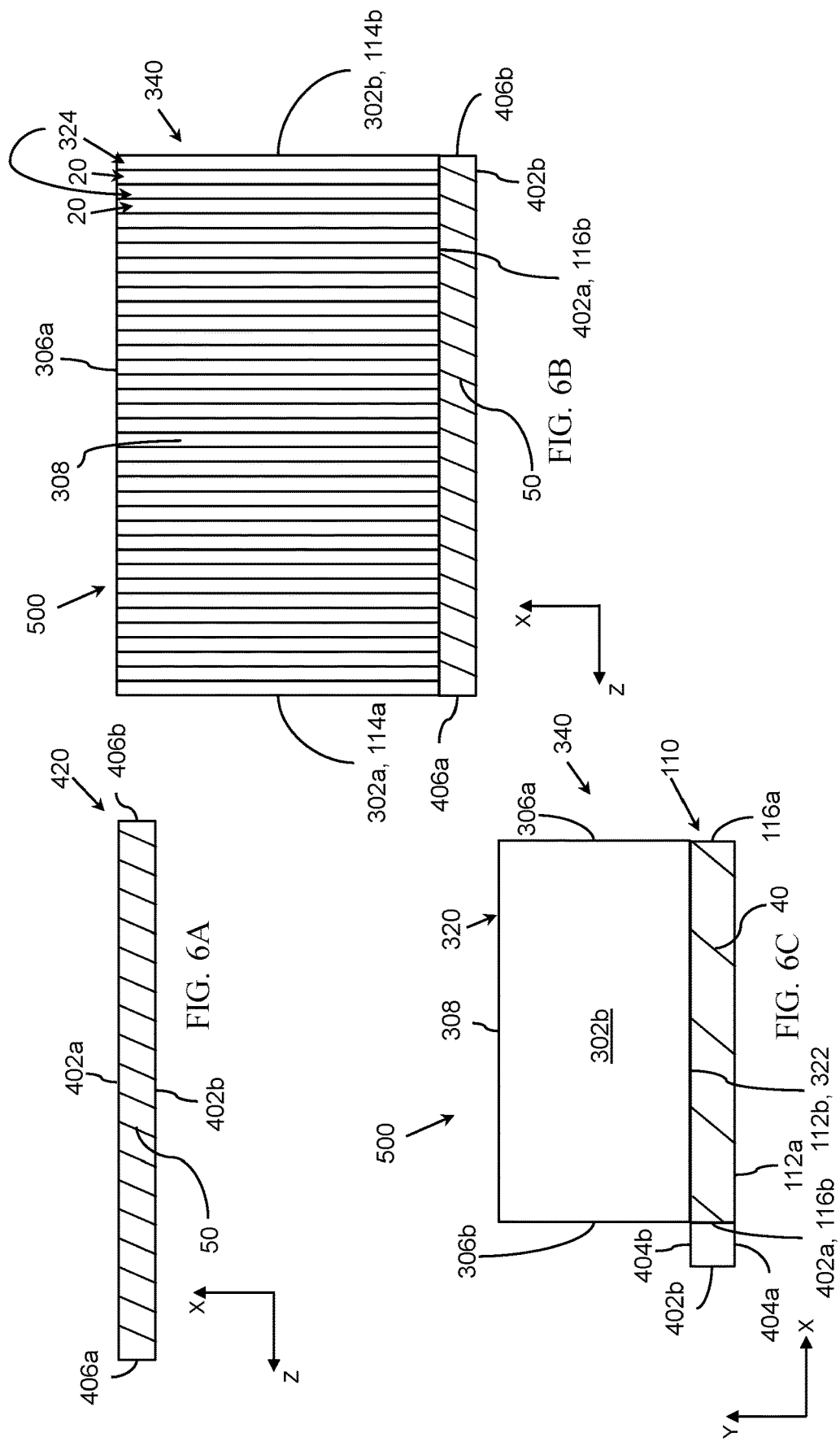

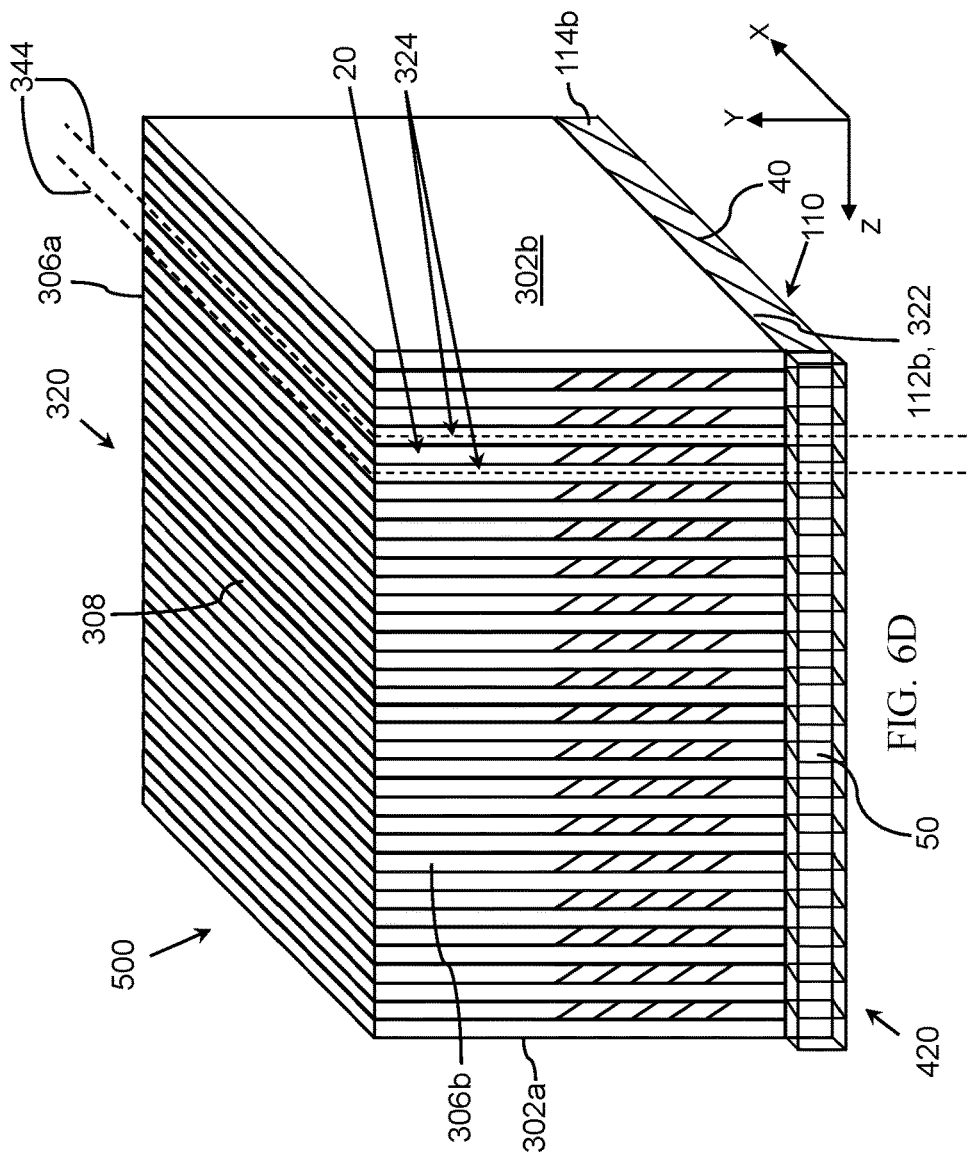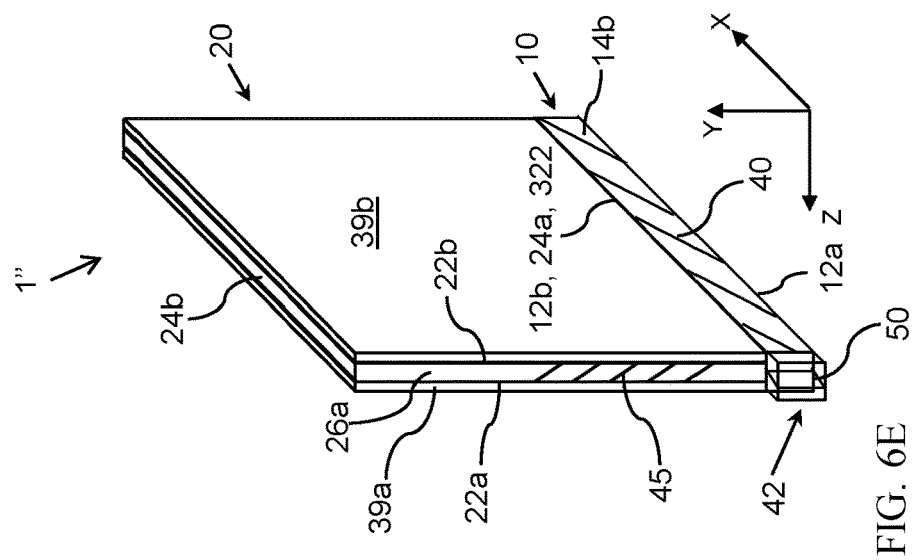

METHODS OF FABRICATION OF OPTICAL APERTURE MULTIPLIERS HAVING RECTANGULAR WAVEGUIDE

CROSS-REFERENCE TO RELATED APPLICATIONS

This application claims priority from U.S. Provisional Patent Application No. 63/197,452, filed Jun. 7, 2021, the disclosure of which is incorporated by reference in its entirety herein.

TECHNICAL FIELD

The present invention relates to optical aperture multipliers, and in particular, optical aperture multipliers that include a rectangular optical waveguide optically coupled with thin slab-type optical waveguides.

BACKGROUND OF THE INVENTION

Optical arrangement for near eye display or head up display require large aperture to cover the area where the eye of the observer is located. Optical devices that provide two-dimensional optical aperture expansion (or multiplication) have been described in various publications by Lumus Ltd (Israel). In one particular set of such optical devices, two-dimensional aperture expansion is achieved by way of two optical waveguides. The first optical waveguide has two pairs of parallel faces that form a rectangular cross-section, and the second optical waveguide, in the form of a thin slab, is optically coupled to the first (rectangular) waveguide and has a pair of parallel major external faces. The two waveguides cooperate to expand the aperture of an injected image in two dimensions, where the first waveguide expands the aperture in a first dimension, and the second waveguide expands the aperture in a second dimension and couples the expanded-aperture image out to be viewed by an eye of a viewer.

In order to maintain image quality, there is a strict requirement for parallelism of the faces of the waveguides and perpendicularity between the two pairs of faces of the rectangular waveguide, as deviations from parallelism and/or perpendicularity can degrade image quality. This requirement for parallelism and perpendicularity can impose strict manufacturing requirements, resulting in higher-cost fabrication processes.

SUMMARY OF THE INVENTION

Embodiments of the present invention provide methods/processes of fabrication of optical aperture multipliers that have rectangular waveguides and optical structures that are intermediate work products in such fabrication methods/processes.

According to the teachings of an embodiment of the present invention, there is provided a method of fabricating an optical aperture multiplier. The method comprises: obtaining a slice having a plurality of external faces including a pair of parallel faces, and a first plurality of mutually parallel partially reflective internal surfaces oblique to the pair of parallel faces; obtaining a first optical structure having a plurality of external surfaces including a planar coupling surface, and a second plurality of mutually parallel partially reflective internal surfaces oblique to the coupling surface; optically coupling the slice with the first optical structure such that one of the faces of the pair of parallel faces is brought into facing relation with the coupling surface, thereby forming a second optical structure; and slicing out at least one optical aperture multiplier from the second optical structure by cutting the second optical structure through at least two cutting planes that are perpendicular to the coupling surface.

Optionally, the first optical structure is produced from a bonded stack of coated transparent plates.

Optionally, the bonded stack has a pair of faces, and the first optical structure is produced from the bonded stack by cutting the bonded stack along a cutting plane that is at an angle relative to at least one of the faces of the pair of faces of the bonded stack.

Optionally, the first optical structure is produced from the bonded stack by further polishing or slicing at the location of the cutting plane to form the coupling surface.

Optionally, the first optical structure is formed as a bonded stack of light-guide optical elements (LOEs), each LOE of the bonded stack having a pair of major parallel surfaces and a subset of the second plurality of mutually parallel partially reflective internal surfaces oblique to the pair of major parallel surfaces.

Optionally, the at least two cutting planes are substantially parallel to the major parallel surfaces of consecutive LOEs.

Optionally, the bonded stack includes a plurality of transparent spacer plates, and the LOEs and the transparent spacer plates alternate along a length of the bonded stack perpendicular to the major parallel surfaces of the LOEs.

Optionally, the at least two cutting planes are located in consecutive spacer plates having one of the LOEs sandwiched therebetween.

Optionally, the method further comprises: obtaining a third optical structure having a plurality of external faces including a coupling face, and a plurality of mutually parallel internal surfaces oblique to the coupling face; and prior to slicing out the at least one optical aperture multiplier, optically coupling the third optical structure with the slice such that coupling face of the third optical structure is brought into facing relation with one of the external faces of the slice.

There is also provided according to an embodiment of the teachings of the present invention a method of fabricating an optical aperture multiplier. The method comprises: obtaining a slice having a plurality of external faces including a pair of parallel faces and a plurality of mutually parallel partially reflective internal surfaces oblique to the pair of parallel faces; producing from a bonded stack of coated transparent plates a first optical structure having a plurality of external surfaces including a coupling surface oblique to major surfaces of the coated transparent plates; optically coupling the slice with the first optical structure such that one of the faces of the pair of parallel faces is brought into facing relation with the coupling surface, thereby forming a second optical structure; and slicing out at least one optical aperture multiplier from the second optical structure by cutting the second optical structure through at least two cutting planes that are perpendicular to the coupling surface.

Optionally, the bonded stack has a pair of faces, and producing the first optical structure from the bonded stack includes cutting the bonded stack along a cutting plane that is at an angle relative to at least one of the faces of the pair of faces of the bonded stack.

Optionally, producing the first optical structure from the bonded stack further includes polishing at the location of the cutting plane to form the coupling surface.

There is also provided according to an embodiment of the teachings of the present invention a method of fabricating an optical aperture multiplier. The method comprises: obtaining a bonded stack of light-guide optical elements (LOEs), each LOE of the bonded stack having a pair of major parallel surfaces and a first plurality of mutually parallel partially reflective internal surfaces oblique to the pair of major parallel surfaces; obtaining a slice having a plurality of external faces including a pair of parallel faces and a second plurality of mutually parallel partially reflective internal surfaces oblique to the pair of parallel faces; optically coupling the slice with the bonded stack such that one of the faces of the pair of parallel faces is brought into facing relation with a coupling surface of the bonded stack and such that the pair of parallel faces are perpendicular to the pair of major parallel surfaces of each of the LOEs of the bonded stack, thereby forming an optical structure; and slicing out at least one optical aperture multiplier from the optical structure by cutting the optical structure through at least two cutting planes that are substantially parallel to the major parallel surfaces of consecutive LOEs and perpendicular to the coupling surface of the bonded stack.

Optionally, the bonded stack includes a plurality of transparent spacer plates, and the LOEs and the transparent spacer plates alternate along a length of the bonded stack perpendicular to the major parallel surfaces of the LOEs.

Optionally, the at least two cutting planes are located in consecutive spacer plates having one of the LOEs sandwiched therebetween.

Optionally, any one of the methods according to embodiments of the present invention further comprises: optically coupling a cover plate with the slice at one or more of the faces of the pair of parallel faces.

Optionally, the cover plate includes a reflective coating.

Optionally, the optically coupling the cover plate with the slice includes bonding the cover plate with one or more of the faces of the pair of parallel faces.

Optionally, the bonding is performed using an optical cement having a refractive index that is lower than a refractive index of a material used to produce the slice.

Optionally, the cover plate is optically coupled with the slice at the one of the faces of the pair of parallel faces that is brought into facing relation with the coupling surface, and the cover plate has polarization managing properties.

Optionally, the cover plate includes at least one of a waveplate or a polarizer.

There is also provided according to an embodiment of the teachings of the present invention an optical structure that is an intermediate work product of an optical aperture multiplier fabrication process. The optical structure comprises: a first portion comprising a plurality of external faces including a pair of parallel faces, and a first plurality of mutually parallel partially reflective internal surfaces oblique to the pair of parallel faces; and a second portion comprising a plurality of external surfaces including a coupling surface, and a second plurality of mutually parallel partially reflective internal surfaces oblique to the coupling surface, the second portion is optically coupled with the first portion such that one of the faces of the pair of parallel faces is in facing relation with the coupling surface and such that at least one optical aperture multiplier is produced when the optical structure is sliced through at least two substantially parallel cutting planes that pass through the first portion and the second portion and are perpendicular to the coupling surface.

Optionally, the second portion is formed from a bonded stack of coated transparent plates.

Optionally, the second portion is formed as a bonded stack of light-guide optical elements (LOEs), each LOE of the bonded stack having a pair of major parallel surfaces and a subset of the second plurality of mutually parallel partially reflective internal surfaces oblique to the pair of major parallel surfaces.

Optionally, the bonded stack includes a plurality of transparent spacer plates, and the LOEs and the transparent spacer plates alternate along a length of the bonded stack perpendicular to the major parallel surfaces of the LOEs.

Optionally, the optical structure further comprises: a third portion having a plurality of external faces including a coupling face, and a plurality of mutually parallel internal surfaces oblique to the coupling face, the third portion is optically coupled with the first portion such that coupling face of the third portion is in facing relation with one of the external faces of the first portion.

There is also provided according to an embodiment of the teachings of the present invention an optical structure that is an intermediate work product of an optical aperture multiplier fabrication process. The optical structure comprises: a first portion having a plurality of external faces including a pair of parallel faces and a plurality of mutually parallel partially reflective internal surfaces oblique to the first pair of parallel faces; and a second portion, formed from a bonded stack of coated transparent plates, having a plurality of external surfaces including a coupling surface oblique to major surfaces of the coated transparent plates, the first portion optically coupled with the second portion such that one of the faces of the pair of parallel faces is in facing relation with the coupling surface and such that at least one optical aperture multiplier is produced when the optical structure is sliced through at least two substantially parallel cutting planes that pass through the first and second portions and are perpendicular to the coupling surface.

Optionally, the bonded stack has a pair of faces, and the second portion is formed by cutting the bonded stack along a cutting plane that is at an angle relative to at least one of the faces of the pair of faces of the bonded stack.

Optionally, the coupling surface is formed by polishing the second portion at the location of the cutting plane.

There is also provided according to an embodiment of the teachings of the present invention an optical structure that is an intermediate work product of an optical aperture multiplier fabrication process. The optical structure comprises: a second portion comprising a plurality of external faces including a pair of parallel faces, and a second plurality of mutually parallel partially reflective internal surfaces oblique to the pair of parallel faces; and a second portion comprising a bonded stack of light-guide optical elements (LOEs), each LOE of the bonded stack having a pair of major parallel surfaces and a first plurality of mutually parallel partially reflective internal surfaces oblique to the pair of major parallel surfaces, the first portion is optically coupled with the second portion such that one of the faces of the pair of parallel faces is in facing relation with a coupling surface of the second portion and such that the pair of parallel faces are perpendicular to the pair of major parallel surfaces of each of the LOEs of the bonded stack.

Optionally, the bonded stack includes a plurality of transparent spacer plates, and the LOEs and the transparent spacer plates alternate along a length of the bonded stack perpendicular to the major parallel surfaces of the LOEs.

Optionally, any one of the intermediate work products according to embodiments of the present invention further comprises: a cover plate optically coupled with the first portion at one or more of the faces of the pair of parallel faces.

Optionally, the cover plate includes a reflective coating.

Optionally, the cover plate is optically coupled with the first portion by bonding the cover plate to one of the faces of the pair of parallel faces.

Optionally, the bonding is performed using an optical cement having a refractive index that is lower than a refractive index of a material used to produce the first portion.

Optionally, the cover plate is optically coupled with the first portion at the one of the faces of the pair of parallel faces that is in facing relation with the coupling surface, and the cover plate has polarization managing properties.

Optionally, the cover plate includes at least one of a waveplate or a polarizer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 1A and 1B are schematic side and front views, respectively, of an optical aperture multiplier having a first rectangular optical waveguide with a plurality of partially reflective internal surfaces, optically coupled with a second thin slab-type optical waveguide having a plurality of partially reflective internal surfaces, that can be fabricated using fabrication processes according to the teachings of embodiments of the present invention;

FIGS. 2A-2I are schematic isometric views illustrating a sequence of steps used in a process of fabrication of an optical aperture multiplier, such as the optical aperture multiplier of FIGS. 1A and 1B, according to a first set of embodiments of the present invention;

FIGS. 3A and 3B are schematic isometric views illustrating a sequence of steps that can be used to fabricate a slice optical structure that is used in the process of FIGS. 2A-2I, according to an embodiment of the present invention;

FIG. 4 is a schematic isometric view illustrating another technique that can be used to fabricate the slice optical structure, according to an embodiment of the present invention;

FIGS. 5A-5D are schematic isometric views illustrating a sequence of steps used in a process of fabrication of an optical aperture multiplier, according to a second set of embodiments of the present invention;

FIG. 6A is a schematic plan view of an optical structure from which multiple optical coupling-in configurations can be extracted, and that can be used in a process of fabrication of an optical aperture multiplier, according to embodiments of the present invention;

FIGS. 6B-6D are schematic plan, front, and isometric views, respectively, of the optical structure of FIG. 6A optically coupled with another optical structure that is produced in one of the steps of the process of FIGS. 5A-5D; and FIG. 6E is a schematic isometric view of an optical aperture multiplier that can be produced using a fabrication process according to embodiments of the present invention.

DESCRIPTION OF THE PREFERRED EMBODIMENTS

Figure 2A:
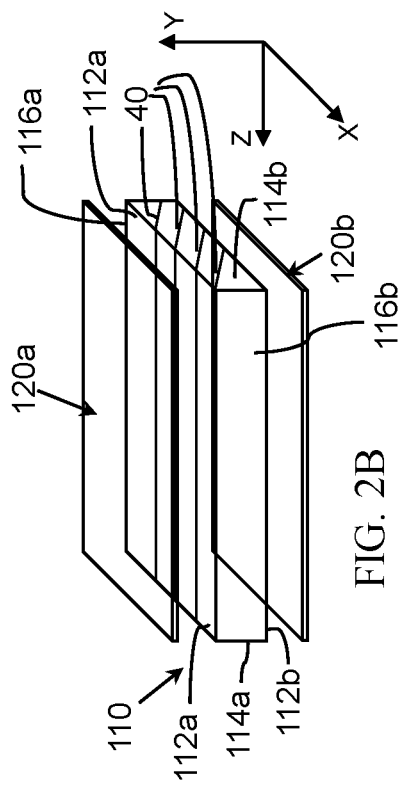

Embodiments of the present invention provide methods/processes of fabrication of optical aperture multipliers that have rectangular waveguides and optical structures that are intermediate work products in such fabrication methods/processes.

The principles and operation of the methods and intermediate work products according to present invention may be better understood with reference to the drawings accompanying the description. The accompanying drawings are provided with an xyz coordinate system that is arbitrarily labeled but which is consistent between the drawings. This xyz coordinate system is used herein to better explain the disclosed embodiments by providing a common reference frame among the drawings.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions, such as, for example, top and bottom, upper and lower, front and back, and the like. These directional references are exemplary only, and are used only for ease of presentation and refer to the arbitrary orientations as illustrated in the drawings. The final optical devices may be deployed in any required orientation.

By way of introduction, commonly owned U.S. Pat. No. 10,133,070, which is incorporated by reference in its entirety herein, describes various embodiments of an optical aperture multiplier 1, shown generally in FIGS. 1A and 1B. The optical aperture multiplier 1 is particularly suitable for use as part of a near eye display or head up display for augmented reality applications. In general terms, the optical aperture multiplier 1 (also referred to as an "optical device") includes a first optical waveguide 10 having a direction of elongation (illustrated arbitrarily herein as corresponding to the "x-axis"). The first optical waveguide 10 is formed from a light-transmitting material and has first and second pairs of parallel faces 12a, 12b, 14a, 14b forming a rectangular cross-section (i.e., the first and second pairs of faces are perpendicular). The first optical waveguide 10 also has an additional pair of faces 16a, 16b (which may or may not be parallel faces). In certain embodiments in which the faces 16a, 16b are parallel faces, the faces 16a, 16b may be perpendicular to the first and second pairs of faces 12a, 12b, 14a, 14b. The first optical waveguide 10 has a plurality of mutually parallel partially reflective internal surfaces (also referred to as "facets") 40 that at least partially traverse the first optical waveguide 10 and are inclined obliquely to the direction of elongation of the first optical waveguide 10 (i.e., the facets 40 are oblique to the faces 12a, 12b).

Throughout this document, the terms "face", "external face", and "external surface" are used interchangeably. As will become apparent, some of such faces are major faces (also referred to as "major external faces" or "major external surfaces").

The optical aperture multiplier 1 also includes a second optical waveguide 20, optically coupled with the first optical waveguide 10, having a third pair of parallel faces 22a, 22b. Here too, a plurality of mutually parallel partially reflective internal surfaces ("facets") 45 at least partially traverse the second optical waveguide 20 and are inclined obliquely to the faces 22a, 22b. The second optical waveguide 20 also has two additional pairs of faces 24a, 24a, 26a, 26b, each of which is non-parallel to faces 22a, 22b, and each of which may or may not be a pair of parallel faces. In certain embodiments, the pairs of faces 22a, 22b, 24a, 24b, 26a, 26b are mutually perpendicular. In certain embodiments, the facets 28 are also inclined obliquely to one or both of the faces 24a, 24b, however, as will be discussed, in other embodiments the facets 28 can be parallel to one or both if the faces 24a, 24b and/or perpendicular to one or both of the faces 26a, 26b.

The second optical waveguide 20 is also formed from a light-transmitting material (light-transmitting substrate), and preferably from the same material that is used to form the first optical waveguide 10 (such that the two optical waveguides 10, 20 have the same refractive index), but forms a thin slab-type waveguide, where the distances between the pairs of faces 24a, 24b, 26a, 26b are at least an order of magnitude greater than the distance between the faces 22a, 22b.

The optical coupling between the optical waveguides 10, 20 (at the interface between the faces 12b, 24a), and the deployment and configuration of partially reflective surfaces 40, 45 are such that, when image light 30 (also referred to as "light beam" or "beam") corresponding to a collimated image (generated by an optical image generator, not shown) is coupled (injected) into the first optical waveguide 10 with an initial direction of propagation at a coupling angle oblique to both the first and second pairs of parallel faces 12a, 12b, 14a, 14b, the image advances by four-fold internal reflection (images a1, a2, a3, a4) along the first optical waveguide 10, with a proportion of intensity of the image reflected at the partially reflective surfaces 40 so as to be coupled into the second optical waveguide 20, and then propagates through two-fold internal reflection (images b1, b1) within the second optical waveguide 20, with a proportion of intensity of the image reflected (deflected) at the partially reflective surfaces 45 so as to be directed outwards from one of the parallel faces 22b as a visible image c, seen by the eye 47 of a viewer.

The first optical waveguide 10 is also referred to as a two-dimensional (2D) waveguide in the sense that it guides the injected image in two dimensions by reflection between two sets of parallel faces (12a, 12b, 14a, 14b), while the second optical waveguide 20 is also referred to as a one-dimensional (1D) waveguide in the sense that it guides the injected image in only one dimension between one pair of parallel faces (22a, 22b). The second optical waveguide 20 is also referred to interchangeably herein as a light-guide optical element (LOE) or ID LOE.

U.S. Pat. No. 10,133,070 further describes processes of fabrication of the optical aperture multiplier 1. These processes rely on individually manufacturing the two optical waveguides 10, 20 and then coupling together the two individual waveguides 10, 20 to produce an individual optical aperture multiplier. However, such fabrication processes make large-scale production of the optical aperture multipliers more challenging.

Embodiments of the present invention provide processes which may be used to fabricate the optical aperture multiplier 1. As will become apparent from the following description, the fabrication processes according to embodiments of the present invention enable large-scale production of optical aperture multipliers, that are particularly suitable for use as part of a near eye display or head up display for augmented reality applications, while maintaining perpendicularity and parallelism over large optical surfaces, thereby enabling tighter manufacturing tolerances.

In a first set of embodiments, as will be described with reference to FIGS. 2A-2I, a bonded stack of coated transparent plates is obtained. The coated surfaces of the transparent plates form a plurality of mutually parallel partially reflective internal surfaces (which ultimately form the facets 45). The bonded stack is cut along a cutting plane to form an optical structure having a plurality of external surfaces that includes a coupling surface oblique to the major surfaces of the coated transparent plates (i.e., the coupling surface is oblique to the partially reflective internal surfaces 45). A slice (which itself is an optical structure) having a pair of external parallel faces and a plurality of mutually parallel partially reflective internal surfaces (which ultimately form the facets 40) oblique to the pair of parallel faces is optically coupled with the optical structure at the coupling surface to form a second optical structure. This second optical structure is then sliced along two or more parallel cutting planes that are perpendicular to the coupling surface in order to extract one or more optical aperture multipliers 1.

In a second set of embodiments, as will be described with reference to FIGS. 5A-5D, a bonded stack of LOEs 20 is obtained. This bonded stack of LOEs constitutes a first optical structure that has a coupling surface that is oblique to the facets 45 of the LOEs 20 (and is also perpendicular to the faces 22a, 22b of the LOEs 20). Similar to as in the first set of embodiments, a slice having a pair of external parallel faces and a plurality of mutually parallel partially reflective internal surfaces (which ultimately form the facets 40) oblique to the pair of parallel faces is optically coupled with the optical structure at the coupling surface to form a second optical structure. This second optical structure is then sliced along two or more parallel cutting planes that are perpendicular to the coupling surface in order to extract one or more optical aperture multipliers 1. In this case, the cutting planes are parallel to the faces 22a, 22b of the LOEs 20, and in certain cases may be located approximately at the faces 22a, 22b of the LOEs 20. As will be discussed, in certain embodiments the bonded stack of LOEs 20 can include a plurality of transparent spacer plates in which the LOEs 20 and the spacer plates alternate along the length of the bonded stack perpendicular to the faces 22a, 22b of the LOEs 20. In such embodiments, the consecutive cutting planes are located in consecutive spacer plates having one LOE sandwiched therebetween.

As will become apparent from the ensuing description, both of these sets of embodiments employ steps that generally include: 1) obtaining a slice having a pair of external parallel faces and a plurality of internal surfaces (which ultimately form the facets 40) oblique to the pair of parallel faces; 2) obtaining a first optical structure that has: i) a plurality of external surfaces that includes a coupling surface, and ii) a coupling surface oblique to the coupling surface; 3) forming a second optical structure by optically coupling the slice with the optical structure such that one of the faces of the pair of parallel faces of the slice is in facing relation with the coupling surface of the first optical structure; and 4) cutting the second optical structure through at least two cutting planes that are perpendicular to the coupling surface.

Turning now to FIGS. 2A-2I, there is illustrated steps of preferred methods (processes) which may be used to fabricate an optical aperture multiplier, such as the optical aperture multiplier 1, according to a first set of embodiments of the present invention.

As illustrated in FIG. 2A, a slice 110 having a plurality of external faces that includes a pair of parallel faces 112a, 112b is obtained. The slice 110 also has a plurality of mutually parallel partially reflective internal surfaces (facets) 40 that are oblique to the faces 112a, 112b. In addition, the slice 110 has another pair of faces 114a, 114b, which in certain embodiments is also a pair of parallel faces that together with the faces 112a, 112b forms a rectangular cross-section. The slice 110 may further have an additional pair of faces 116a, 116b which may or may not be parallel faces. In certain embodiments, the three pairs of faces 112a, 112b, 114a, 114b, 116a, 116b of the slice 110 are mutually orthogonal.

Parenthetically, the slice 110 is itself an optical structure, and the term "slice" is used herein as a naming convention as a way of referencing preferred methods in which the optical structure 110 can be produced. In general, the slice 110 can be obtained in various ways, typically whereby the slice is "sliced-out" from an optical structure formed of stacked plates. In one example method, as illustrated in FIG. 3A, a plurality of coated transparent plates 102 having parallel upper and lower surfaces 103a, 103b are obtained. The coatings of the coated transparent plates are selectively reflective coatings that provide the partial reflectivity of the facets 40 (i.e., such that the facets 40 are partially reflective). The plates 102 are aligned and arranged in a staggered stack, and bonded together to form a bonded stack 101, as illustrated in FIG. 3B. The bonding is such that for each plate 102, the lower surface 103b of the plate is joined with the upper surface 103a of the adjacent plate. Throughout this document, the term "bonded" or "bonding" should be understood to mean attached or attaching with an optical cement or glue, or any other suitable adhesive.

The bonded stack 101 is then cut along at least two parallel cutting planes (indicated by dashed lines 104 in FIG. 3B) that are oblique to the surfaces 103a, 103b to produce one or more slices 110. The cutting planes 104 are preferably spaced at predetermined and uniform intervals. As a result of the cutting along the cutting planes 104, each slice 110 has a pair of parallel faces 112a, 112b and a plurality of mutually parallel partially reflective internal surfaces (facets) 40 oblique to the faces 112a, 112b. It is noted that the cutting planes 104 define the oblique angle of the facets 40 in the final rectangular waveguide 10. In the illustrated embodiment, the planes 104 are perpendicular to the side surfaces of the plates 102 (which in the figure is in a plane parallel to xy plane). However, in certain embodiments, the cutting planes 104 can have an inclination angle relative to the side surfaces (xy plane), such that the facets 40 are also oblique to the parallel faces 114a, 114b. The stack 101 may be further cut along one or more pairs of cutting planes (preferably but not necessarily pairs of parallel cutting planes), that are preferably but not necessarily orthogonal to the planes 104, to set one or more of the other pairs of faces 114a, 114b, 116a, 116b of the slice 110.

Another exemplary method for obtaining the slice 110 is illustrated in FIG. 4. Here, the plates 102 are aligned and bonded to form a non-staggered bonded stack 109 (i.e., a rectangular or approximately rectangular block), which is then cut along parallel cutting planes 104' (that are oblique to the surfaces 103a, 103b) to extract one or more slices 110. In the illustrated embodiment, the planes 104' are perpendicular to the side surfaces of the plates 102 (which in the figure is in a plane parallel to xy plane). However, in certain embodiments, the cutting planes 104' can have an inclination angle relative to the side surfaces (xy plane), such that the facets 40 are also oblique to the parallel faces 114a, 114b. Also, similar to as with the stack 101, the stack 109 may be further cut along one or more pairs of cutting planes (preferably but not necessarily pairs of parallel cutting planes), that are preferably but not necessarily orthogonal to the planes 104', to set one or more of the other pairs of faces 114a, 114b, 116a, 116b of the slice 110.

Figure 2B:
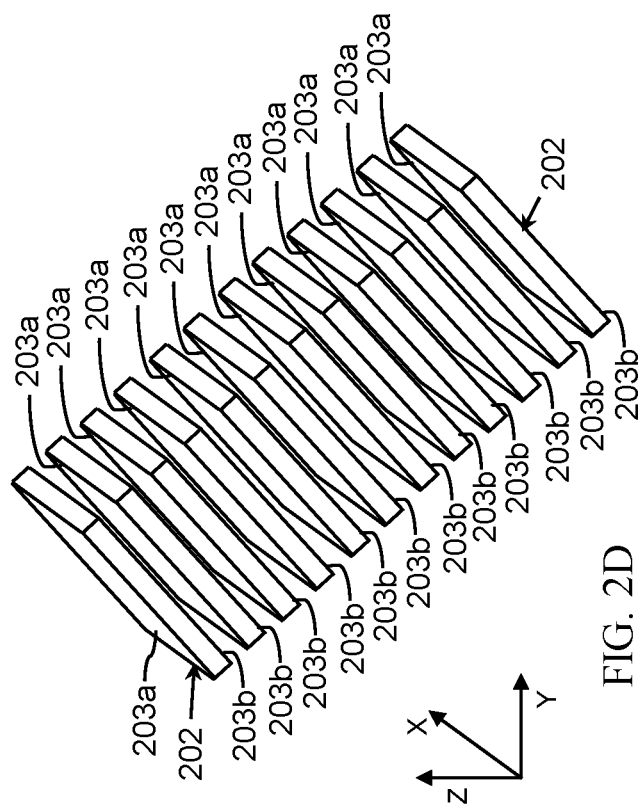
Figure 2C:
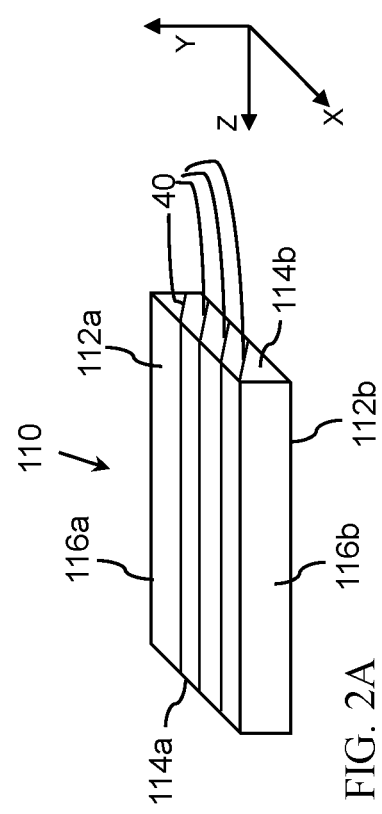

Returning now to FIGS. 2A-2I, in certain embodiments a plate 120a can be aligned with, and applied to, the face 112a of the slice 110, as illustrated in FIGS. 2B and 2C. Alternatively, or in addition, a plate 120b can be aligned with, and applied to, the face 112b of the slice 110, also as illustrated in FIGS. 2B and 2C. The application of the plates 120a, 120b to the faces 112a, 112b constitutes an optical coupling between the plates 120a, 120b and the slice 110 at the faces 112a, 112b. In certain embodiments, the optical coupling is effectuated by bonding, whereby the plate 120a is bonded to the slice 110 such that the plate is joined with the face 112a, and/or the plate 120b is bonded to the slice 110 such that the plate 120b is joined with the face 112b.

The cover plates 120a, 120b can provide both mechanical protection to the slice 110, for example by protecting against chips that may form on the slice 110 during polishing of either or both of the faces 112a, 112b. In addition to providing mechanical protection, the cover plates 120a, 120b can serve optical functions by having various materials or coatings applied thereto. In one example, the plate 120a (and/or the plate 120b) includes a reflective coating, which prevents light from the external (real-world) scene from entering the waveguide 10, while also preserving conditions of internal reflection at the face 12a (and/or the face 12b) of the waveguide 10. In another example, the optical cement used to bond together the plate 120a (and/or the plate 120b) and the slice 110 has a low refractive index (lower than the refractive index of the material from which the slice 110 is constructed, i.e., lower than the refractive index of the plates 102) in order to maintain conditions of total internal reflection at the face 12a (and/or the face 12b) of the waveguide 10 in spite of accumulation of dirt, debris, or other particulates at the interface between the plate 120a, 120b and the slice 110. Optical cement having, for example, a refractive index of approximately 1.35 can be particularly suitable for bonding the plates 120a, 120b to the slice 110.

In certain embodiments, one of the plates 120a or 120b can have polarization managing properties (i.e., the plate 120b can be a polarization managing plate) to control or modify the polarization of the light that is to be transmitted into the waveguide 20 from the waveguide 10. The polarization management plate can be implemented, for example, as a waveplate (such as a halfwave plate) and/or a polarizer.

It is noted that instead of optically coupling plates 120a, 120b that have the aforementioned materials or coatings, the materials or coatings can be applied directly to the either or both of the faces 112a, 112b. For example, a reflective coating can be applied directly to either or both of the faces 112a, 112b to prevent unwanted reflections and preserve conditions of internal reflection at the face 112a and/or face 112b.

Figure 2D:
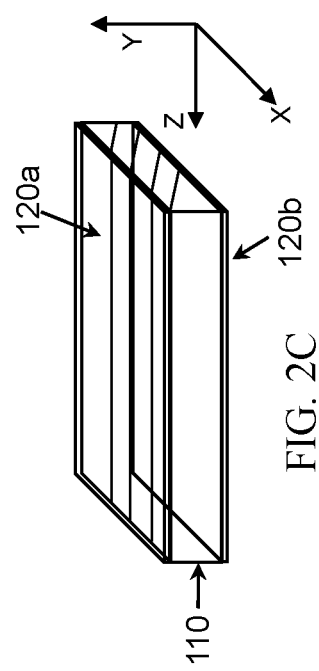

Referring now to FIG. 2D, a plurality of coated transparent plates 202 having parallel upper and lower major surfaces 203a, 203b are obtained. The coatings of the coated transparent plates are selectively reflective coatings that provide the partial reflectivity of the facets 45 (i.e., such that the facets 45 are partially reflective) of the optical waveguide 20.

The plates 202 are aligned and arranged in a stack (preferably a non-staggered stack), and bonded together to form a bonded stack 210 of parallel plates 202, as illustrated in FIG. 2E. The bonding is such that for each plate 202, the lower surface 203b of the plate is joined with the upper surface 203a of the adjacent plate. The bonded stack 210 has three pairs of faces 212a, 212b, 214a, 214b, 216a, 216b, each of which may or may not be a pair of parallel faces. The faces 212a, 212b are preferably parallel faces, and thus are preferably parallel to the surfaces 203a, 203b of the plates 202. In addition, the surface 203a of the top plate in the bonded stack 210 forms the face 212a, and the surface 203b of the bottom plate in the bonded stack 210 forms the face 212b.

In certain embodiments, the pairs of faces 212a, 212b and 214a, 214b are both pairs of parallel faces and together form a rectangular cross-section. In certain embodiments, each of the pairs of faces of the bonded stack 210 is a pair of parallel faces, and the three pairs of faces 212a, 212b, 214a, 214b, 216a, 216b are mutually orthogonal. It is noted that in general, if any pair of faces of the bonded stack 210 is not initially a pair of parallel faces, either or both of the faces of that pair can be polished to achieve parallelism between the faces of the pair.

It is noted that the exemplary stack 210 in the non-limiting embodiment illustrated in FIG. 2E is a non-staggered stack, whereby the various side surfaces of the plates 202 (i.e., the surfaces of the plates 202 other than the upper and lower surfaces 203a, 203b) are aligned and coplanar to form generally flat and smooth faces 214a, 214b, 216a, 216b. For example, the frontside surfaces of the plates 202 that are in planes that are parallel to the yz plane are aligned to form the face 214a, and the backside surfaces of the plates 202 (not shown) that are in planes that are parallel to the yz plane are aligned to form the face 214b, whereby each of the faces 214a, 214b is a generally flat and smooth surface. Similar principles apply to the side surfaces that form the faces 216a, 216b. However, in certain embodiments, for example in embodiments in which the stack 210 is formed as a staggered stack, one or more of the faces 214a, 214b, 216a, 216b can include steps or variations in depth (i.e., set down or step up) of the side surfaces of the constituent plates 202 that form the stack 210. Therefore, the term "face", as used herein to describe and claim faces 214a, 214b, 216a, 216b, generally refers to the apparent face that is in a plane that is parallel to the surfaces of the plates 202 that form that face. For example, the face 214a refers to the apparent face that is in a plane that is parallel to the yz plane, despite variations in depth of the frontside surfaces of the plates 202. In embodiments in which the stack 210 is a non-staggered stack and the plates 202 are perfectly aligned (for example as illustrated in FIG. 2E), the apparent faces and the actual faces are one in the same.

Turning now to FIGS. 2F and 2G, an optical structure 220 (FIG. 2G) is produced from the bonded stack 210. The optical structure 220 has a plurality of external surfaces (faces) that includes a planar coupling surface 222 (also referred to as a "coupling face", "interfacing surface", "interface surface", or simply "face" 222) that is oblique to the major surfaces 203a, 203b of the coated transparent plates 202 (i.e., the coupling surface 222 will be oblique to the internal facets 45 formed from the coated transparent plates 202). The face 24a of the second waveguide 20 is ultimately formed from the coupling surface 222, and thus a portion of the coupling surface 222 forms part of the interface plane between the two waveguides 10, 20.

The external faces of the optical structure 220 also includes a major face 234a (formed from the face 214a of the bonded stack 210, as will be discussed below) that adjoins the coupling surface 222 at an angle. In certain embodiments, such as the embodiment illustrated in FIG. 2G, the adjoining angle between the coupling surface 222 and the face 234a is 90° (i.e., the coupling surface 222 is perpendicular to the face 234a). In other embodiments, the adjoining angle between the coupling surface 222 and the face 234a is an oblique angle, preferably an acute angle. Such oblique angle embodiments are particularly suitable for producing a final optical device (optical aperture multiplier product) in which the facets 45 of the second optical waveguide 20 have a tilt angle relative to the first optical waveguide 10 (i.e., tilted relative to faces 12a, 12b). The selection of the particular oblique (and preferably acute) angle may be based on the optical design specification of the final optical aperture multiplier product.

In certain embodiments, the bonded stack 210 (whether non-staggered or staggered) is cut along a cutting plane 204 (FIG. 2F) to produce the optical structure 220. In other embodiments, the optical structure 220 can be produced by grinding or polishing the bonded stack 210 to gradually remove the material in the portion 211 of the bonded stack 210 until reaching the cutting plane 204.

The cutting plane 204 is preferably oblique to the face 212a (and thus oblique to the upper and lower surfaces 203a, 203b of the plates 202 that form the stack 210/optical structure 220), and is at an angle relative to the face 214a, such that the cutting plane 204 passes through portions of the faces 212a, 216b and such that the resulting coupling surface 222 is also oblique to the face 212a and at an angle relative to the face 214a. As discussed above, the angle of the cutting plane 204 relative to the face 214a can, in certain embodiments, be 90° (i.e., the cutting plane 204 can be perpendicular to the face 214a), and in other embodiments can be an oblique (preferably acute) angle.

In general, any deviation from the desired angle between the cutting plane 204 and the face 214a, or any deviation from the desired angle between the resulting coupling surface 222 and the face 234a, can be corrected by further polishing or slicing/cutting the optical structure 220 at the coupling surface 222 (i.e., at the location of the cutting plane 204). To avoid wastage, the location of the cutting plane 204 in the optical structure 220 is preferably selected such that the length of the coupling surface 222 (length being measured in the "," direction in FIG. 2G) corresponds to length of the slice 110 (also measured in the "z" direction in FIG. 2A).

The portion 211 of the bonded stack 210 that is removed (either by cutting at the cutting plane 204 or grinding or polishing to the cutting plane 204) can, in certain embodiments, generally be a triangular prism portion that includes the following faces: i) a first portion 231a of the face 212a (that can be a minority portion of the face 212a), ii) two approximately triangular portions of the faces 214a, 214b, and iii) a portion (which may be a rectangular portion) 237 of the face 216b. In embodiments in which the plane 204 is perpendicular to the face 214*a*, the first portion 231*a* is a rectangular portion. In embodiments in which the plane 204 is oblique to the face 214*a*, the first portion 231*a* is a non-parallelogram (and a "trapezoid" in American English). Note that the principles used to define the term "face" in the context of the faces 214*a*, 214*b*, 216*a*, 216*b* also apply here in the context of the faces 234*a*, 234*b*, 236*a*, 236*b*.

As a result, in certain embodiments the optical structure 220 (formed by removal of the portion 211) can have the following faces: i) a pair of preferably parallel faces 232*a*, 232*b* in which the face 232*a* is a second portion of the face 212*a* (which is the remaining portion of the face 212*a* after removal of the first portion 231*a*) and in which the face 232*b* is the same as the face 212*b*, ii) a pair of preferably (but not necessarily) parallel trapezoidal or general quadrilateral shaped faces 234*a*, 234*b* that are may be perpendicular to the faces 232*a*, 232*b* and that are formed by removal of the triangular portions of the faces 214*a*, 214*b*, iii) a face 236*a* that is the same as the face 216*a*, and that may be perpendicular to the faces 232*a*, 232*b*, 234*a*, 234*b*, iv) a face 236*b*, that may be parallel to the face 236*a*, and that is the remaining portion of the face 216*b* after removal of the portion 237, and v) the interfacing face 222 that is oblique to the face 232*a* (i.e., the remaining portion of the face 212*a* after removal of the portion 211) and is perpendicular (as in FIG. 2G) or oblique (preferably acute) to the face 234*a* (i.e., the remaining portion of the face 214*a* after removal of the portion 211).

In embodiments in which the plane 204 is perpendicular to the face 214*a*, the second portion 232*a* is a rectangular portion. In embodiments in which the plane 204 is oblique to the face 214*a*, the second portion 232*a* is a non-parallelogram (and a "trapezoid" in American English).

Note that the plane 204 provides (defines) the boundary between the portion 231*a* and the face 232*a*, and also provides the boundary between the portion 237 and the face 236*b*.

Again, any deviation from the desired angle between the coupling surface 222 and the face 234*a* can be corrected by polishing the optical structure 220 at the location of the cutting plane 204. In fact, since the coupling surface 222 ultimately forms part of the interface plane between the two waveguides 10, 20, it is preferable to polish the coupling surface 222 even in instances where there are no such angular deviations (or situations in which any such angular deviations are so minor that they do not require correction) in order to ensure that the coupling surface 222 is of high optical quality. In embodiments in which the optical structure 220 is produced by polishing the bonded stack 210 to gradually remove the material in the portion 211 of the bonded stack 210, no further polishing step may be necessary.

Turning now to FIG. 2H, the slice 110 is optically coupled with the optical structure 220 to form an optical structure 240 (which is an intermediate work product of an optical aperture multiplier fabrication process), whereby the faces 112*a*, 112*b* are parallel to the coupling surface 222 and whereby one of the faces 112*a* or 112*b* is brought into facing relation with the coupling surface 222. As an intermediate work product, the optical structure 240 includes the slice 110 and the optical structure 220 as respective first (or second) and second (or first) portions. In embodiments in which the slice 110 does not include any cover plate at the coupling face of the slice 110 (i.e., face 112*a* or 112*b*), the optical coupling is such that one of the faces 112*a* or 112*b* is attached to the coupling surface 222.

In the illustrated embodiment, the face 112*b* is shown as being in facing relation with the coupling surface 222, but the face 112*a* can alternatively be brought into facing relation with the coupling surface 222. The selection of which of the faces 112*a*, 112*b* is to be brought into facing relation with the coupling surface 222 can be based on the optical design specification of the final optical aperture multiplier product, including, for example, the deployment location of the optical image generator relative to the waveguide 10. The optical coupling can be effectuated by adhesive bonding such that the face 112*b* (or 112*a*) and the coupling surface 222 are joined together. Alternatively, the optical coupling can be a mechanical coupling with an air gap of a designed thickness between the face 112*b* (or 112*a*) and the coupling surface 222. In embodiments in which the coupling face (112*b* or 112*a*) of the slice 110 has a cover plate, the optical coupling between the slice 110 and the optical structure 220 is such that the cover plate 120*b* (or 120*a*) is optically attached to the coupling surface 222, which can be effectuated by bonding the cover plate 120*b* (or 120*a*) with the coupling surface 222 such that the cover plate 120*b* (or 120*a*) and the coupling surface 222 are joined together, or via mechanical coupling with an air gap between the cover plate 120*b* (or 120*a*) and the coupling surface 222.

The optical structure 240 is then cut along at least two parallel cutting planes (indicated by dashed lines 244 in FIG. 2H) that are perpendicular to the coupling surface 222 and that pass through the slice 110 and the optical structure 220 to produce one or more optical aperture multipliers. A single such optical aperture multiplier is shown in FIG. 2I. It is noted that the waveguide 10 has a cover plate 13*a* at the face 12*a*, which is produced as a result of cutting the cover plate 120*a* at the cutting planes 244.

Although only a single optical aperture multiplier is shown as being sliced-out from the optical structure 240 in FIGS. 2H and 2I, a plurality of optical aperture multipliers can be sliced-out of the optical structure 240 by increasing the size and/or number of plates 202 used to form the bonded stack 210.

Note that in order to maintain consistent thickness (measured arbitrarily herein along the "z-axis) between the multiple optical aperture multipliers that are sliced out from the optical structure 240, it is preferable that the cutting planes 244 be spaced apart at predetermined and uniform intervals.

The perpendicularity between the cutting planes 244 and the coupling surface 222 simultaneously achieves: i) parallelism between the faces 14*a*, 14*b* of the first optical waveguide 10, ii) perpendicularity between first and second pairs of parallel faces 12*a*, 12*b*, 14*a*, 14*b* (thereby achieving formation of the rectangular cross-section by the faces 12*a*, 12*b*, 14*a*, 14*b*), and iii) parallelism between the faces 22*a*, 22*b* of the second optical waveguide 20.

For increased (optimal) performance, it is also preferable that the cutting planes 244 are perpendicular to the face 234*a* (and hence perpendicular to the face 214*a*). In certain embodiments, the cutting planes 244 can be parallel to the faces 114*a*, 114*b*, while in other embodiments the cutting planes 244 can be oblique to the faces 114*a*, 114*b*.

In certain embodiments, the planes of the internal facets 40 of the slice 110 are perpendicular to the cutting planes 244. It is noted that in embodiments in which perpendicularity between the facets 40 and the cutting planes 244 is desired, the slice 110 and the optical structure 220 should be aligned with high-degree accuracy to ensure minimal deviation from perpendicularity (for example within 20 arcseconds).

In other embodiments, the planes of the internal facets 40 of the slice 110 are oblique to the cutting planes 244. In such embodiments, it is preferable that the angle between the facets 40 and the cutting planes 244 is far from perpendicular, for example at least 10° and more preferably at least 20° from perpendicular.

In order to achieve the desired angle between the facets 40 and the cutting planes 244, the slice 110 is aligned with the optical structure 220 prior to slicing out the optical aperture multiplier(s). Preferably, the slice 110 is aligned with the optical structure 220 prior to the step of optically coupling the slice 110 with the optical structure 220.

The aligning of the slice 110 with the optical structure 220 can be performed in various ways. In one example, alignment is performed by maintaining the optical structure 220 in a fixed position and orientation and maintaining parallelism between the face 112*b* or cover plate 120*b* (or face 112*a* or cover plate 120*a*) and the coupling surface 222, and rotating the slice 110 (with the face 112*b* (or 120*a*) or cover plate 120*b* (or 120*a*) on the coupling surface 222) relative to the optical structure 220 until the desired angle between the facets 40 and the cutting planes 244 is achieved (for example 90° within 20 arcseconds if perpendicularity is desired, or for example 80° or less if an oblique angle between the facets 40 and the cutting planes 244 is desired). In another example, the slice 110 is maintained in a fixed position and orientation, and the optical structure 220 is rotated relative to the slice 110 while the face 112*b* or cover plate 120*b* (or face 112*a* or cover plate 120*a*) is on and parallel to the coupling surface 222 until the desired angle between the facets 40 and the cutting planes 244 is achieved. In yet another example, neither the slice 110 nor the optical structure 220 are maintained in fixed positions, and the slice 110 and the optical structure 220 are relatively rotated in opposite directions while the face 112*b* or cover plate 120*b* (or face 112*a* or cover plate 120*a*) is on and parallel to the coupling surface 222 until the desired angle between the facets 40 and the cutting planes 244 is achieved.

Parenthetically, it is noted that the oblique angle of the coupling surface 222 (and thus the oblique angle of the cutting plane 204 that forms the coupling surface 222) relative to the upper and lower surfaces 203*a*, 203*b* of the plates 202 that form the stack 210/optical structure 220 defines, in part, the oblique angle of the facets 45 of the second optical waveguide 20 of the final optical aperture multiplier product. This is primarily due to the interdependency of the orientations of the coupling surface 222 and the cutting planes 244 (i.e., the cutting planes 244 are perpendicular to the coupling surface 222). For example, as the angle between the plane 204/coupling surface 222 and the surfaces 203*a*, 203 becomes shallower (i.e., as the coupling surface 222 becomes closer to parallel to the face 216*b*), the cutting planes 244 will produce facets 45 having a shallower inclination angle relative to the faces 22*a*, 22*b* of the second optical waveguide 20. Similarly, as the angle between the plane 204/coupling surface 222 and the surfaces 203*a*, 203 becomes steeper (i.e., as the coupling surface 222 becomes closer to parallel to the faces 212*a*, 212*b*), the cutting planes 244 will produce facets 45 having a steeper inclination angle relative to the faces 22*a*, 22*b* of the second optical waveguide 20.

Referring again to the optical aperture multiplier illustrated in FIG. 2I, it is noted that the faces 14*a*, 22*a* of the optical aperture multiplier form a single continuous external face that is formed as a result of cutting the optical structure 240 along one of the cutting planes 244. Similarly, the faces 14*b*, 22*b* of the optical aperture multiplier form a single continuous external face that is formed as a result of cutting the optical structure 240 along another one of the cutting planes 244. These two continuous faces should be parallel (since parallelism of the faces 14*a*, 14*b* and the faces 22*a*, 22*b* is critical in order to preserve conditions of internal reflection of light through both of the optical waveguides 10, 20). Parallelism of these two continuous faces can be preserved by ensuring that the cutting planes 244 are parallel planes. However, deviation from parallelism of the continuous faces due to deviation from parallelism of the cutting planes 244 can be corrected by polishing the continuous faces after cutting the optical structure 240 along the cutting planes 244. In addition, preservation of parallelism of the two continuous surfaces also preserves perpendicularity between the two continuous surfaces and the faces 12*a*, 12*b*, which ensures perpendicularity between the two pairs of parallel faces 12*a*, 12*b*, 14*a*, 14*b* (and the formation of the rectangular cross-section) of the first optical waveguide 10. This preservation of parallelism and perpendicularity is critical in order to preserve image uniformity as image light advances along the first optical waveguide 10 by four-fold internal reflection.

Although not illustrated in FIGS. 2A-2I, either or both of the faces 22*a*, 22*b* can optionally have a transparent cover plate bonded thereto or otherwise optically coupled therewith. Such transparent cover plates can be used to advantage to avoid double reflections within the LOE 20, i.e., situations in which light is reflected twice from the same facet 45. Specifically, the cover plates help to ensure that, after being reflected once by a facet 45, the transmitted portion of the light will propagate over or under that facet, advancing directly to the next facet, thereby resulting in enhanced image uniformity. Examples of optical aperture multipliers having transparent cover plates attached to external faces of the LOE 20 are described in commonly owned International Patent Application No. PCT/IL2022/050216, entitled "Optical Aperture Multipliers Having a Rectangular Waveguide", filed Feb. 24, 2022.

Turning now to FIGS. 5A-5D, there are illustrated steps of preferred methods (processes) which may be used to fabricate an optical aperture multiplier according to a second set of embodiments of the present invention. In principle, the second set of embodiments are similar to the first set of embodiments in that the second set of embodiments also employ a step of optically coupling the slice 110 to an optical structure 320 to form a new optical structure from which one or more optical aperture multipliers can be extracted via slicing along two or more cutting planes. However, as mentioned above and as will become further apparent from the discussion below, the primary differences between the two sets of embodiments are with respect to the optical structures 220, 320 with which the slice 110 is optically coupled.

Referring now particularly to FIGS. 5A and 5B, the optical structure 320 is formed as a bonded stack 321 of LOEs 20, i.e., a stack of LOEs 20 which are bonded together. The resulting optical structure 320 (i.e., the bonded stack 321) has a plurality of external surfaces including a pair of parallel surfaces 302*a*, 302*b*, and a plurality of mutually parallel partially reflective internal surfaces (facets) 45 oblique to the surfaces 302*a*, 302*b*.

Each of the LOEs of the bonded stack 321 is as described above with reference to FIGS. 1A and 1B, i.e., each of the LOEs has a plurality of external faces including a pair of parallel faces 22*a*, 22*b* (as well as additional faces 24*a*, 24*b*, 26*a*, 26*b*) and a plurality of internal facets 45 oblique to the external faces 22*a*, 22*b*. The internal facets 45 of each LOE 20 constitute a subset of the facets of the optical structure 320. Although the bonded stack 321 is illustrated in FIGS. 5A and 5B as being formed from only five individual LOEs 20, a larger number of LOEs can typically be used to form the stack, including, for example, ten or more LOEs, and in certain cases twenty or more LOEs.

Methods for fabricating such individual LOEs 20 have been described extensively in various publications by Lumus Ltd. (Israel), including, for example, U.S. Pat. Nos. 7,634,214, 8,873,150, PCT publication WO 2016/103263, and PCT publication WO 2020/212835.

The external surfaces of the optical structure 320/bonded stack 321 also includes a planar coupling surface 322 (similar to coupling surface 222 of the first set of embodiments) to which the slice 110 is to be optically coupled. As will be discussed, the coupling surface 322 can be formed from the faces 24a of the constituent LOEs that form the bonded stack 321. The external surfaces of the optical structure 320/bonded stack 321 may also include a back surface 306a (formed, for example, by aligning the faces 26a of the LOEs so as to be coplanar), a front surface 306b (formed, for example, by aligning the faces 26b of the LOEs so as to be coplanar) opposite the back surface 306a, and a top (or upper) surface 308 (formed, for example, by aligning the faces 24b of the LOEs so as to be coplanar) opposite the coupling surface 322. In certain embodiments, the optical structure 320/bonded stack 321 is a rectangular cuboid, whereby the surfaces 306a and 306b, and the surfaces 308 and 322 are each a pair of parallel surfaces, and whereby the three pairs of parallel surfaces 302a, 302b, 306a, 306b, 308, 322 are mutually perpendicular.

In certain embodiments, such as the embodiments illustrated in FIGS. 5A-5D, the bonded stack 321 of LOEs 20 may also include a plurality of transparent spacer plates 324, and the LOEs 20 and the spacer plates 324 alternate along a length of the bonded stack 321 that is perpendicular to the faces 22a, 22b of the constituent LOEs 20. Portions of these transparent spacer plates 324 form transparent cover plates bonded to the faces 22a, 22b of the final optical aperture multiplier product. In such embodiments, a given spacer plate 324 is bonded with two adjacent LOEs such that the face 22a of a first adjacent LOE is joined to one side of the spacer plate 324 and the face 22b of a second adjacent LOE is joined to the opposing side of the spacer plate 324.

In embodiments in which no transparent spacer plates 324 are employed, adjacent LOEs are bonded together such that the face 22a of each LOE is joined to the face 22b of the adjacent LOE.

In order to form the bonded stack 321, the LOEs 20 are preferably aligned such that all of the faces 22a, 22b of the LOEs are mutually parallel, and such that all of the internal facets 45 of the LOEs are mutually parallel (as shown in FIGS. 5A and 5B). In addition, the faces 24a of the LOEs 20 may be aligned so as to be coplanar, thereby forming the coupling surface 322. In embodiments having spacer plates 324, alignment of the faces 24a may also include alignment of the minor external surfaces of the spacer plates 324. It is noted that if the faces 24a are not aligned so as to be coplanar, the bonded stack 321 can be cut and polished along a plane that is perpendicular to the faces 22a, 22b of the LOEs 20 to remove extraneous portions of one or more of the LOEs in order to produce the coupling surface 322.

The pair of parallel surfaces 302a, 302b of the optical structure 320 are parallel to the faces 22a, 22b of the individual LOEs 20. Furthermore, in embodiments in which spacer plates 324 are provided, the surface 302a is formed from the spacer plate 324 at one end of the stack 321 (the right end in FIG. 5B), and the surface 302b is formed from the spacer plate 324 at the opposite end of the stack 321 (the left end in FIG. 5B). Parenthetically, the two spacer plates 324 at the ends of the stack 321 may have an increased thickness relative to the spacer plates 324 that are at the interior portions of the stack 321. In addition, the spacer plates 324 at the interior portions of the stack preferably have a common (i.e., same) thickness.

In embodiments in which no spacer plates 324 are provided, the surface 302a is formed from the face 22a of the LOE at one end of the stack 321 (the right end in FIG. 5B), and the surface 302b is formed from the face 22b of the LOE at the opposite end of the stack 321 (the left end in FIG. 5B).

As illustrated in FIG. 5C, the slice 110 is optically coupled with the optical structure 320/bonded stack 321 to form an optical structure 340 (which is an intermediate work product of an optical aperture multiplier fabrication process), whereby the faces 112a, 112b are parallel to the coupling surface 322 and whereby one of the faces 112a or 112b is brought into facing relation with the coupling surface 322. As an intermediate work product, the optical structure 340 includes the slice 110 and the optical structure 320 (bonded stack 321) as respective first (or second) and second (or first) portions. It is noted that by way of illustrative example only, FIG. 5C show an optical structure 320 that is formed as a bonded stack of 18 LOEs (as opposed to the five LOE stack illustrated in FIGS. 5A and 5B).

Note that although FIG. 5C shows the slice 110 as having a single cover plate (cover plate 120a attached to the face 112a), it should be understood that the face 112b (which is the coupling face of the slice 110) can also have a cover plate 120b bonded therewith.

In embodiments in which the slice 110 does not include any cover plate at the coupling face of the slice 110 (i.e., face 112a or 112b), the optical coupling between the slice 110 and the optical structure 320 is such that one of the faces 112a or 112b is attached to the coupling surface 322. In the illustrated embodiment, the face 112a is shown as being in facing relation with the coupling surface 322, but the face 112b can alternatively be brought into facing relation with the coupling surface 322. The optical coupling can be effectuated by adhesive bonding such that the face 112a (or 112b) and the coupling surface 322 are joined together. Alternatively, the optical coupling can be a mechanical coupling with an air gap of a designed thickness between the face 112a (or 112b) and the coupling surface 322.

In embodiments in which the coupling face (112b or 112a) of the slice 110 has a cover plate, the optical coupling between the slice 110 and the optical structure 320 is such that the cover plate 120a (or 120b) is optically attached to the coupling surface 322, which can be effectuated by bonding the cover plate 120a (or 120b) with the coupling surface 322 such that the cover plate 120a (or 120b) and the coupling surface 322 are joined together, or via mechanical coupling with an air gap between the cover plate 120a (or 120b) and the coupling surface 322.

The optical structure 340 is then cut along at least two preferably parallel cutting planes (indicated by dashed lines 344 in FIG. 5C) that are parallel to the faces 22a, 22b of the LOEs 20 and are perpendicular to the coupling surface 322, and that pass through the slice 110 and the optical structure 320, to produce one or more optical aperture multipliers. A single such optical aperture multiplier 1' is shown in FIG. 5D. Similar to the optical aperture multiplier 1 of FIG. 2I, the waveguide 10 has cover plate 13a at the face 12a, which is produced as a result of cutting the cover plate 120a at the cutting planes 344. Note that in contrast to the optical aperture multiplier 1 of FIG. 2I, the optical aperture multiplier 1' also has cover plates 39a, 39a (formed by cutting through consecutive spacer plates 324) attached to faces 22a, 22b.

Although only a single optical aperture multiplier is shown as being sliced-out from the optical structure 340 in FIGS. 5C and 5D, a plurality of optical aperture multipliers can be sliced-out of the optical structure 340.

Any deviation from parallelism of the cutting planes 344 relative to the faces 22a, 22b can be corrected by polishing the sliced-out optical aperture multiplier at the sight/location of the cuts along the cutting planes 344.

In embodiments in which transparent spacer plates 324 are employed, two consecutive cutting planes 344 are located in consecutive spacer plates having one of the LOEs 20 of the bonded stack 321 sandwiched therebetween. Preferably each cutting plane is located at the center of the corresponding spacer plate 324 so as to effectively divide the spacer plate 324 into two approximately equal portions. It is noted that in situations in which it is desirable to have transparent cover plates bonded to the faces 22a, 22b of the waveguide 20, fabrication of the optical aperture multiplier according to the second set of embodiments may be preferable to fabrication according to the first set of embodiments. This is due to the fact that fabrication of the optical aperture multiplier according to the second set of embodiments results in the cover plates (designated 39a and 39b in FIG. 5D) being flush with the side surfaces 14a, 14b of the waveguide 10, thereby providing a sleek configuration in which the cover plates do not protrude beyond the surfaces 14a, 14b (which can occur when applying cover plates to waveguide 20 fabricated according to the first set of embodiments).

In embodiments in which no transparent spacer plates 324 are employed, it is preferable that consecutive cutting planes 344 are located between the faces 22a, 22b of consecutive LOEs 20 of the bonded stack 321, and more preferably at the bonding regions formed between the faces 22a, 22b of consecutive LOEs 20, such that each sliced-out optical aperture multiplier has only one of the LOEs 20 of the bonded stack 321. For example, a first of the cutting planes preferably passes between the bonding region between the face 22b of a first one of the LOEs 20 and the face 22a of a second one of the LOEs 20 that is adjacent to, and bonded with, the first one of the LOEs 20. A second of the cutting planes that is adjacent to the first of the cutting planes passes between the bonding region between the face 22b of the second one of the LOEs 20 and the face 22a of a third one of the LOEs 20 that is adjacent to, and bonded with, the second one of the LOEs 20. It is noted herein that the bonding regions (formed between the faces 22a, 22b of consecutive LOEs 20) can provide guides for placement of the cutting planes 344.

Prior to formation of the optical structure 340 (with or without spacer plates 324), the slice 110 and the optical structure 320 are preferably properly aligned in order to achieve increased optical performance in a vein similar to as described above with reference to FIG. 2H. For example, the slice 110 and the optical structure 320 are preferably aligned such that the surface 302a and one of the faces 114a or 114b are parallel (and preferably coplanar), and such that the surface 302b and the other of the faces 114b or 114a are parallel (and preferably coplanar). It may also be preferable to align the slice 110 and the optical structure 320 such that the surface 306a and one of the faces 116a or 116b are parallel (and preferably coplanar), and such that the surface 306b and the other of the faces 116b or 116a are parallel (and preferably coplanar). Such preferred alignment is illustrated in FIG. 5C.

Alignment may be achieved by rotating the slice 110 relative to the optical structure 320, similar to as describe above when discussing alignment of the slice 110 and the optical structure 220. It is also noted that the alignment and optical coupling between the slice 110 and the optical structure 320 necessarily results in the facets 40 being non-parallel to the facets 45.

Note that in the embodiments described herein, the slice 110 has an initial direction of elongation (illustrated arbitrarily herein as corresponding to the "z-axis") which is perpendicular to the direction of elongation of the waveguide 10, and which is also generally perpendicular to the cutting planes 244, 344. This direction of elongation of the slice 110 enables multiple optical aperture multipliers to be extracted from the optical structure (240 or 340) whereby the waveguide portion of each extracted optical aperture multiplier is extracted from the slice 110 portion of the optical structure (240 or 340).

It is noted that one or more additional optical components can be optically coupled or bonded with the optical aperture multiplier product, produced using the methods described herein, at one or more external faces of the waveguides. Examples of such optical components include, for example, optical coupling-in configurations, polarizers, depolarizers, and lenses. Optical coupling-in configurations, in the form of external coupling prisms or external coupling reflector arrangements, are used to introduce/inject collimated image light from an optical image generator into the first optical waveguide 10 such that the injected image advances through the first optical waveguide 10 by four-fold internal reflection.

By way of one set of examples, any of the coupling prisms described in U.S. Pat. No. 10,133,070, for example with reference to FIGS. 8A-14C of that document, can be bonded or otherwise optically coupled with the first optical waveguide 10 in order to provide light injection to the first optical waveguide 10. In certain cases, attachment of such a coupling prism may require application of additional coating to parts of the external waveguide faces 12a, 12b, 14a, 14b and/or cutting or otherwise removing a portion of the first optical waveguide 10.

In another set of examples, a coupling prism (which in certain configurations may also include a coupling reflector on one of the faces of the coupling prism) can be deployed in association with a portion of the front or back face 14a, 14b of the first optical waveguide 10, for example as described in commonly owned International Patent Application No. PCT/IL2022/050216, entitled "Optical Aperture Multipliers Having a Rectangular Waveguide", filed Feb. 24, 2022. Such deployment may require dividing the face 12a or 12b into a first region (corresponding to a majority portion of the face 12a or 12b) and a second region (corresponding to the remaining minority of the face 12a or 12b) that have different optical characteristics. The subdivision can be effectuated by a coating or material deployed in association with a majority portion or a minority portion of the face 12a or 12b, which can be accomplished by applying such coating or material to the requisite portions of the face 112a or 112b of the slice 110.

The optical image generator that provides the collimated image to the optical coupling-in configuration is typically a micro projector optical device, that includes at least one light source, typically deployed to illuminate a spatial light modulator, such as a liquid crystal on silicon (LCoS) chip. The spatial light modulator modulates the projected intensity of each pixel of the image, thereby generating an image. Alternatively, the optical image generator may include a scanning arrangement, typically implemented using a fast-scanning mirror, which scans illumination from a laser light source across an image plane of the image generator while the intensity of the beam is varied synchronously with the scanning motion on a pixel-by-pixel basis, thereby projecting a desired intensity for each pixel. In both cases, collimating optics are provided to generate an output projected image which is collimated to infinity. Some or all of the above components of the image generator are typically arranged on surfaces of one or more polarizing beamsplitter cube or other prism arrangement, as is well known in the art.

As mentioned above, it may be desirable to provide one or more additional optical components, in particular optical coupling-in components, to be optically coupled with the optical aperture multiplier. To this end, it may be particularly advantageous to provide an additional optical structure—from which optical coupling-in components can be extracted—that can be optically coupled with the optical structures described above in order to enable mass-production of optical aperture multipliers each having a pair of waveguides and an optical coupling-in configuration attached thereto or otherwise optically coupled therewith. Bearing this in mind, FIGS. 6A-6E illustrate steps of methods (processes) which may be used to fabricate an optical aperture multiplier having waveguides 10, 20 and an optical coupling-in configuration bonded to (or otherwise optically coupled with) the waveguide 10, according to embodiments of the present invention. FIG. 6A illustrates an additional optical structure 420 from which multiple optical coupling-in configurations can be extracted, and FIGS. 6B-6E illustrate an optical structure 500 formed by the optically coupling of the optical structure 420 with the optical structure 340 and the extraction of an optical aperture multiplier from the optical structure 500. It is noted that although the examples illustrated in FIGS. 6B-6D are provided within the context of the fabrication process according to the second set of embodiments, similar techniques can also be applied to the fabrication process according to the first set of embodiments.

Turning now to FIGS. 6A-6E in detail, the optical structure 420 is formed from a light-transmitting material and has a plurality of external faces including a pair of parallel faces 402a, 402b, and a plurality of mutually parallel internal surfaces 50 oblique to the faces 402a, 402b. The external faces of the optical structure 420 can also include faces 404a, 404b (which in certain embodiments can be a pair of parallel faces that are perpendicular to faces 402a, 402b) as well as faces 406a, 406b (which in certain embodiments can be a pair of parallel faces, and can also be perpendicular to faces 402a, 402b, 404a, 404b.

In certain embodiments, the internal surfaces 50 are reflective surfaces, whereas in other embodiments the internal surfaces 50 are partially reflective surfaces (such as beam splitting surfaces). The optical structure 420 can be obtained in various ways, including producing the optical structure 420 by stacking and bonding together transparent plates (which can be coated with reflective or partially reflective coatings) and then slicing the bonded plates, in a manner similar to that used to produce the slice 110, as described above.

As illustrated in FIGS. 6B-6D, the optical structure 420 is optically coupled with the slice 110 portion of the optical structure 340 such that a coupling face of the optical structure 420 (which can be one of the faces 402a, 402b) is brought into facing relation with one of the external faces of the slice 110. The optically coupling between the optical structures 340, 420 produces a new optical structure 500 that is an intermediate work product having three portions: 1) the bonded stack of LOEs portion (i.e., optical structure 320), 2) the slice 110 portion, and 3) the optical structure 420 portion.

In the illustrated embodiments, the coupling face of the optical structure 420 is the face 402a, which is deployed in facing relation to the face 116b of the slice 110. In certain embodiments, the optical structure 420 is bonded with the slice 110 such that the coupling face (e.g., face 402a) is joined to the face 116b (or face 116a). Note that the selection of which of the external faces of the slice 110 is to be brought into facing relation with the coupling face of the optical structure 420 can be based on the optical design specification of the final optical aperture multiplier product, including, for example, the deployment location of the optical image generator relative to the optical coupling-in configuration and the waveguide 10.

Prior to optically coupling the optical structure 420 with the slice 110, the optical structure 420 and the slice 110 are preferably aligned. In the illustrated embodiment, the alignment is preferably such that each internal surface 50 corresponds to, and is preferably located between the faces 22a, 22b of, a corresponding one of the LOEs of the bonded stack 321. In certain embodiments, the alignment is such that each internal surface 50 extends between the faces 22a, 22b of the corresponding LOE. The alignment is further such that the internal surfaces 50 are non-parallel to the facets 40 and 45.

In certain embodiments, the alignment of the optical structure 420 with the slice 110 is also such that the faces 114a and 406a are parallel (and preferably coplanar), and such that the faces 114b and 406b are parallel (and preferably coplanar).

FIG. 6D shows the optical structure 500 with example cutting planes 344 (same as illustrated in FIG. 5C). The optical structure 500 is cut along the two or more cutting planes 344 to produce (extract/slice-out) one or more optical aperture multipliers. A single such sliced-out optical aperture multiplier 1″, having a pair of waveguides (10, 20) and a coupling-in configuration 42 attached thereto, is illustrated in FIG. 6E. The optical coupling-in configuration 42 is produced from the optical structure 420 and includes a single internal surface 50.

Note that although the slice 110 is illustrated without cover plates 120a, 120b in the embodiments of FIGS. 6A-6E, it should be understood that one or both of the cover plates 120a, 120b can be applied to the respective faces 112a, 112b.

As mentioned above, similar techniques for producing optical aperture multipliers with attached optical coupling-in configurations can be used with the fabrication process according to the first set of embodiments. For example, the optical structure 420 can be optically coupled with the optical structure 240 of FIG. 2H, for example at the face 116b, in order to produce an optical aperture multiplier having a pair of waveguides 10, 20 and an optical coupling-in configuration 42 attached thereto.

It is noted that the optical structure 420 illustrated in the drawings is just one non-limiting example of an optical structure from which optical coupling-in configurations can be extracted. In general, any optical structure having a coupling surface (e.g., face 402a) and a plurality of optical coupling-in surfaces (e.g., internal surfaces 50) or elements or surface sections geometrically associated with the coupling surface can be optically coupled with the optical structure 340 or 240. An elongated prism is another non-limiting example of an optical structure from which optical coupling-in configurations can be extracted. Such an elongated prism may have a plurality of external surfaces that includes a coupling surface (for optically coupling with the slice 110) and an optical coupling-in surface that can be subdivided into a plurality of non-overlapping sections. Each section can correspond, for example, to a different respective LOE 20 of the optical structure 320, such that when sliced along cutting planes 344 each section becomes the optical coupling-in surface for the optical aperture multiplier.

The alignment of the various optical structures described herein can be performed using any suitable optical alignment apparatus/device(s)/tool(s) that perform suitable optical alignment techniques/methods. Such suitable optical alignment apparatus/device(s)/tool(s) can include, for example, one or more computerized control device, one or more computerized processing device, one or more optical subsystem having, for example, one or more light source, one or more light detector/sensor (including optical sensors), one or more optical component (e.g., one or more lens, one or more folding optic, one or more prism, etc.), autocollimators, and the like. Details of non-limiting examples of suitable optical alignment apparatus/device(s)/tool(s)/method(s) that can be used for aligning the various optical structures described herein can be found in various publications by Lumus Ltd. (Israel), including, for example, International Patent Application No. PCT/IL2021/051377 and International Patent Application No. PCT/IL2021/051378.

The present disclosure has described various cutting steps in which optical structures or materials are cut along cutting planes in order to produce various other optical structures or optical products. It is noted that in certain embodiments, some or all of the surfaces of these optical structures and materials, including and in particular those surfaces that result from these cutting steps, can be polished to, for example, increase optical quality. In certain embodiments, polishing can be performed as part of, or subsequent to, these cutting steps, and prior to subsequent optical coupling (e.g., bonding) steps. In the above-described fabrication methods, the cutting or slicing of the various optical structures described herein can be performed by any suitable cutting apparatus/device/tool, as should be understood by those of ordinary skill in the art. The polishing of the faces and surfaces of the various optical structures described herein can be performed by any suitable polishing apparatus/device/tool, as should be understood by those of ordinary skill in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of fabricating an optical aperture multiplier comprising:
    obtaining a bonded stack of light-guide optical elements (LOEs), each LOE of the bonded stack having a pair of major parallel surfaces and a first plurality of mutually parallel partially reflective internal surfaces oblique to the pair of major parallel surfaces;
    obtaining a slice having a plurality of external faces including a pair of parallel faces and a second plurality of mutually parallel partially reflective internal surfaces oblique to the pair of parallel faces;
    optically coupling the slice with the bonded stack such that one of the faces of the pair of parallel faces is brought into facing relation with a coupling surface of the bonded stack and such that the pair of parallel faces are perpendicular to the pair of major parallel surfaces of each of the LOEs of the bonded stack, thereby forming an optical structure; and
    slicing out at least one optical aperture multiplier from the optical structure by cutting the optical structure through at least two cutting planes that are substantially parallel to the major parallel surfaces of consecutive LOEs and perpendicular to the coupling surface of the bonded stack.

2. The method of claim 1, further comprising: optically coupling a cover plate with the slice at one or more of the faces of the pair of parallel faces.

3. The method of claim 1, wherein the cover plate includes a reflective coating.

4. The method of claim 1, wherein the optically coupling the cover plate with the slice includes bonding the cover plate with one or more of the faces of the pair of parallel faces.

5. The method of claim 1, wherein the bonding is performed using an optical cement having a refractive index that is lower than a refractive index of a material used to produce the slice.

6. The method of claim 1, wherein the cover plate is optically coupled with the slice at the one of the faces of the pair of parallel faces that is brought into facing relation with the coupling surface, and wherein the cover plate has polarization managing properties.

7. The method of claim 1, wherein the cover plate includes at least one of a waveplate or a polarizer.

8. An optical structure that is an intermediate work product of an optical aperture multiplier fabrication process, the optical structure comprising:
   a first portion comprising a plurality of external faces including a pair of parallel faces, and a second plurality of mutually parallel partially reflective internal surfaces oblique to the pair of parallel faces; and
   a second portion comprising a bonded stack of light-guide optical elements (LOEs), each LOE of the bonded stack having a pair of major parallel surfaces and a first plurality of mutually parallel partially reflective internal surfaces oblique to the pair of major parallel surfaces, wherein the first portion is optically coupled with the second portion such that one of the faces of the pair of parallel faces is in facing relation with a coupling surface of the second portion and such that the pair of parallel faces are perpendicular to the pair of major parallel surfaces of each of the LOEs of the bonded stack.

9. The optical structure of claim 8, further comprising: a cover plate optically coupled with the first portion at one or more of the faces of the pair of parallel faces.

10. The optical structure of claim 8, wherein the cover plate includes a reflective coating.

11. The optical structure of claim 8, wherein the cover plate is optically coupled with the first portion by bonding the cover plate to one of the faces of the pair of parallel faces.

12. The optical structure of claim 8, wherein the bonding is performed using an optical cement having a refractive index that is lower than a refractive index of a material used to produce the first portion.

13. The optical structure of claim 8, wherein the cover plate is optically coupled with the first portion at the one of the faces of the pair of parallel faces that is in facing relation with the coupling surface, and wherein the cover plate has polarization managing properties.

* * * * *